United States Patent [19]

Winterstein

[11] Patent Number: 5,060,204
[45] Date of Patent: Oct. 22, 1991

[54] METHOD OF LAYER STRIPPING TO DETERMINE FAULT PLANE STRESS BUILD-UP

[75] Inventor: Donald F. Winterstein, Brea, Calif.

[73] Assignee: Chevron Research and Technology Company, San Francisco, Calif.

[21] Appl. No.: 545,030

[22] Filed: Jun. 27, 1990

[51] Int. Cl.$^5$ .......................... G01V 1/36; G01V 1/40
[52] U.S. Cl. ....................................... 367/75; 367/31; 367/51; 364/421
[58] Field of Search .......................... 367/31, 75, 51; 364/421

[56] References Cited

U.S. PATENT DOCUMENTS

| | | | |
|---|---|---|---|
| 4,631,963 | 12/1986 | Sprunt et al. | 367/13 |
| 4,713,968 | 12/1987 | Yale | 367/31 |
| 4,794,572 | 12/1988 | Sondergeld et al. | 367/31 |
| 4,803,666 | 2/1989 | Alford | 367/75 |
| 4,817,061 | 3/1989 | Alford et al. | 367/75 |
| 4,888,743 | 12/1989 | Thomsen | 367/75 |

OTHER PUBLICATIONS

Yale et al., "Prediction of Fracture Direction . . . Anisotropy", The Log Analyst, 3-4/89, pp. 65-70.
Sheriff, R. B., S. B. G., Encyclopedia Dictionary of Explor. Geophys., 1974, L. C. No. 72-9456J, p. 209.
Seismic 11-Shear Wave Anisotropy: Observation and Analysis, Invited Introductory Paper: "Shear Waves in Exploration: A Prospective", by Don F. Winterstein, pp. 638-641.
"Comparison of Three Methods for Finding Polarization Direction of the Fast Shear Wave", by D. F. Winterstein, pp. 118-119.
Geophysics, vol. 51, No. 3, Mar. 1986, "Anisotropy Effects in P-Wave and Sh-Wave Stacking Velocities Contain Information on Lithology", by D. F. Winterstein, pp. 661-672.
Geophysics, vol. 55, No. 8, Aug. 1990, "Velocity Anisotropy terminology for Geophysicists", by D. F. Winterstein, pp. 1070-1088.
Geophysics, vol. 55, No. 4, Apr. 1990, "Velocity Anisotropy in Shale Determined from Crosshole Seismic and Vertical Seismic Profile Data", by D. F. Winterstein et al., pp. 470-479.
Geophysics, vol. 55, No. 6, Jun. 1990, "Analysis of Conventional and Converted Mode Reflections at Putah Sink, California Using Three-Component Data", by C. Frasier and D. Winterstein, pp. 646-659.
"Shear-Wave Polarization and Subsurface Stress Directions at Lost Hills Field", by D. F. Winterstein and M. A. Meadows.
"Change in Shear-Wave Polarization Azimuth with Depth in Cymric and Railroad Gap Oil Fields", by D. F. Winterstein and M. A. Meadows.
"An Integrated Study of Seismic Anisotropy and the Fracture System in the Spraberry Sandstone, Pembrook Field, Upton and Reagen Counties, Texas", by V. D. Cox, W. D. Rizer, P. D. Anno, and J. H. Queen.

(List continued on next page.)

Primary Examiner—Nelson Moskowitz
Attorney, Agent, or Firm—Edward J. Keeling; Matt W. Carson

[57] ABSTRACT

A method for analyzing seismic shear wave data, using a layer stripping technique, to determine fault plane stress build-up is disclosed. Polarization directions of shear wave data, from either a vertical seismic profile or from surface reflection data, are analyzed, and time lags between fast and slow split shear wave are determined. Natural polarization directions of and time lags between the split shear waves in an upper layer are determined above the shallowest depth where data cues suggest polarization changes take place. Source and receiver axes of the data below the depth of polarization changes are rotated by an azimuth angle, to bring the axes into proper alignment. A static time shift is then applied to eliminate the time lag in the upper layer above the depth where polarization changes were indicated. Shear wave polarization azimuth angles, and time lags between the shear waves are determined for the depth of investigation, and are compared to the strike of a nearby fault. The procedure is repeated at a later time to evaluate any changes in the azimuth angles or time lags.

16 Claims, 15 Drawing Sheets

LAYER STRIPPING RATIONALE

OTHER PUBLICATIONS

Presented at the 59th Annual Internat. Mtg., Soc. Explor. Geophys., "-Wave Birefringence Measurement and Detection in the Paris Basin", by F. Lefeuvre et al., pp. 786–788 (Expanded Abstract).

Presented at the 56th Ann. Internat. Mtg., Soc. Explor. Geophys., "Seismic Detection of Subsurface Fractures", by D. F. Becker and A. I. Perelberg, pp. 466–488 (Expanded Abstract).

Presented at the 56th Ann. Internat. Mtg., Soc. Explor. Geophys., "Shear Waves Revealed: Extensive Dilatancy Anisotropy Confirmed", by Stuart Crampin et al., pp. 481–484 (Expanded Abstract).

Presented at the 56th Ann. Internat. Mtg., Soc. Explor. Geophys., Expanded Abstracts, "Analysis of Conventional and Converted Mode Reflections at Putah Sink, California, Using Three-Component Data", by C. W. Frasier and D. F. Winterstein, pp. 396–400.

Presented at the 56th Ann. Internat. Mtg., Soc. Explor. Geophys., Expanded Abstract, "Multi-Component Vertical Seismic Profiling Using Impulsive P and S-Wave Source", by D. S. Lee, pp. 819–822.

Presented at the 56th Ann. Internat. Mtg., Soc. Explor. Geophys., Expanded Abstracts, "An Integrated Three-Component Approach to Fracture Detection", by M. A. Martin, T. L. Davis, and T. J. O'Rourke, pp. 235–236.

Presented at the 56th Ann. Internat. Mtg., Soc. Explor. Geophys., Expanded Abstracts, "Azimuthal Anisotropy: Occurrence and Effect on Shear-Wave Data Quality", by H. A. Willis, G. L. Rethford, and E. Bielanski, pp. 479–481.

Presented at the 56th Ann. Internat. Mtg., Soc. Explor. Geophys., Expanded Abstracts, "Shear Data in the Presence of Azimuthal Anisotropy: Dilley, Texas", by R. M. Alford, pp. 476–479.

Journal of Geophysical Research, vol. 88, No. B7, Jul. 10, 1983, "Shear Wave Polarization Anisotropy in the Upper Mantle Beneath Honshu, Japan", by M. Ando, Y. Ishikawa, and F. Yamazaki, pp. 5850–5864.

Geophysics, vol. 54, No. 11, Nov. 1989, "Interpretation of Total Wave-Field Data Over Lost Hills Field, Kern County, California", by S. G. Squires et al., pp. 1420–1429.

Journal of Geophysical Research, vol. 74, No. 27, Dec. 15, 1969, "Stress-Induced Velocity Anisotropy in Rock: An Experimental Study", by A. Nur & G. Simmons, pp. 6667–6674.

Journal of Geophysical Research, vol. 76, No. 8, Mar. 10, 1971, "Effects of Stress on Velocity Anisotropy in Rocks with Cracks", by A. Nur, pp. 2022–2034.

Geophys., J. R. Astr. Soc. (1984), 76: "Earthquake Prediction: A New Physical Basis", by S. Crampin, and R. Evans and B. K. Atkinson, pp. 147–156.

Geophys., J. R. Astr. Soc. (1985), 83: "Shear-Wave Polarization Near the North Anatolian Fault-I. Evidence for Anisotropy-Induced Shear-Wave Splitting", by David C. Booth, Stuart Crampin, Russ Evans, and Graham Roberts, pp. 61–73.

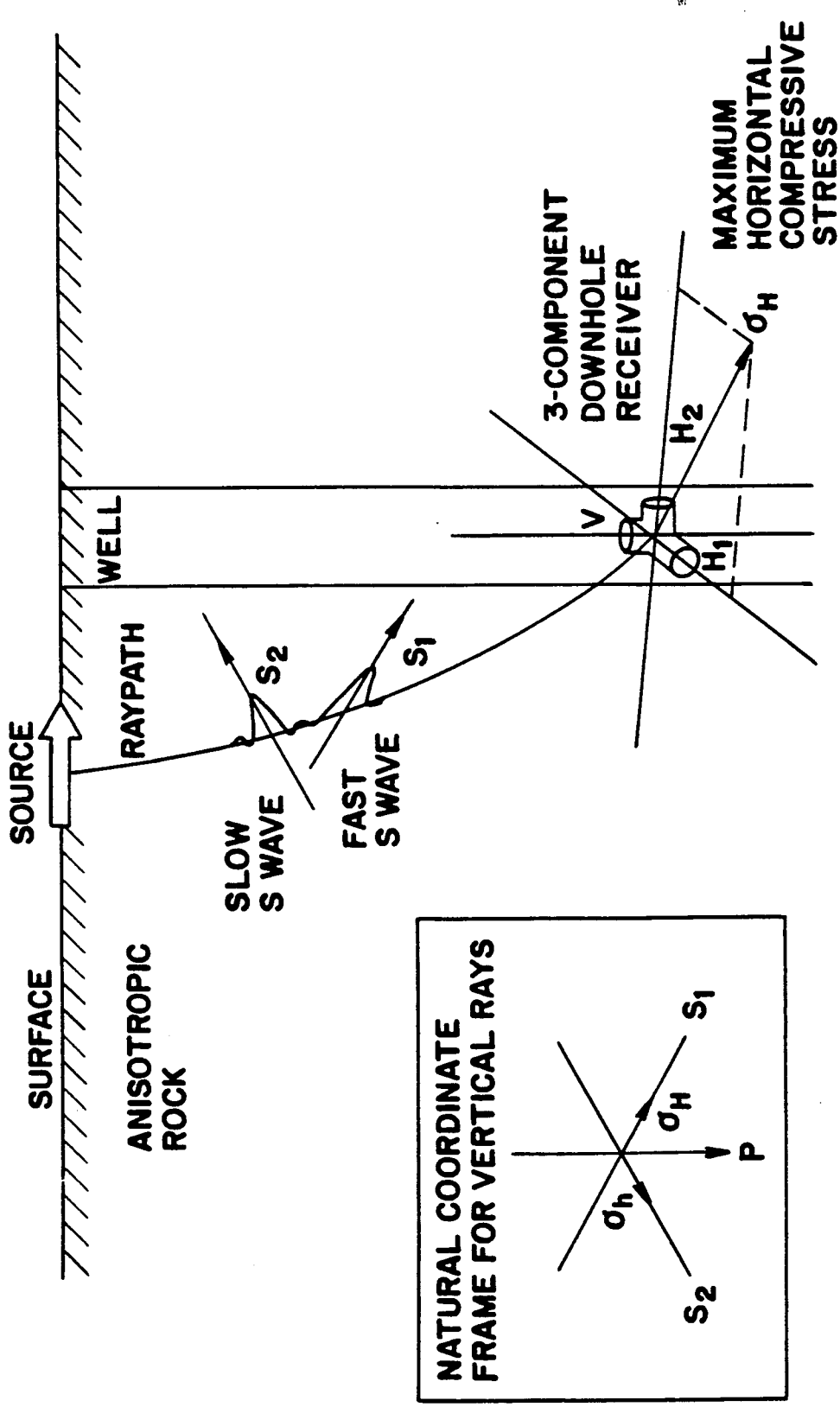

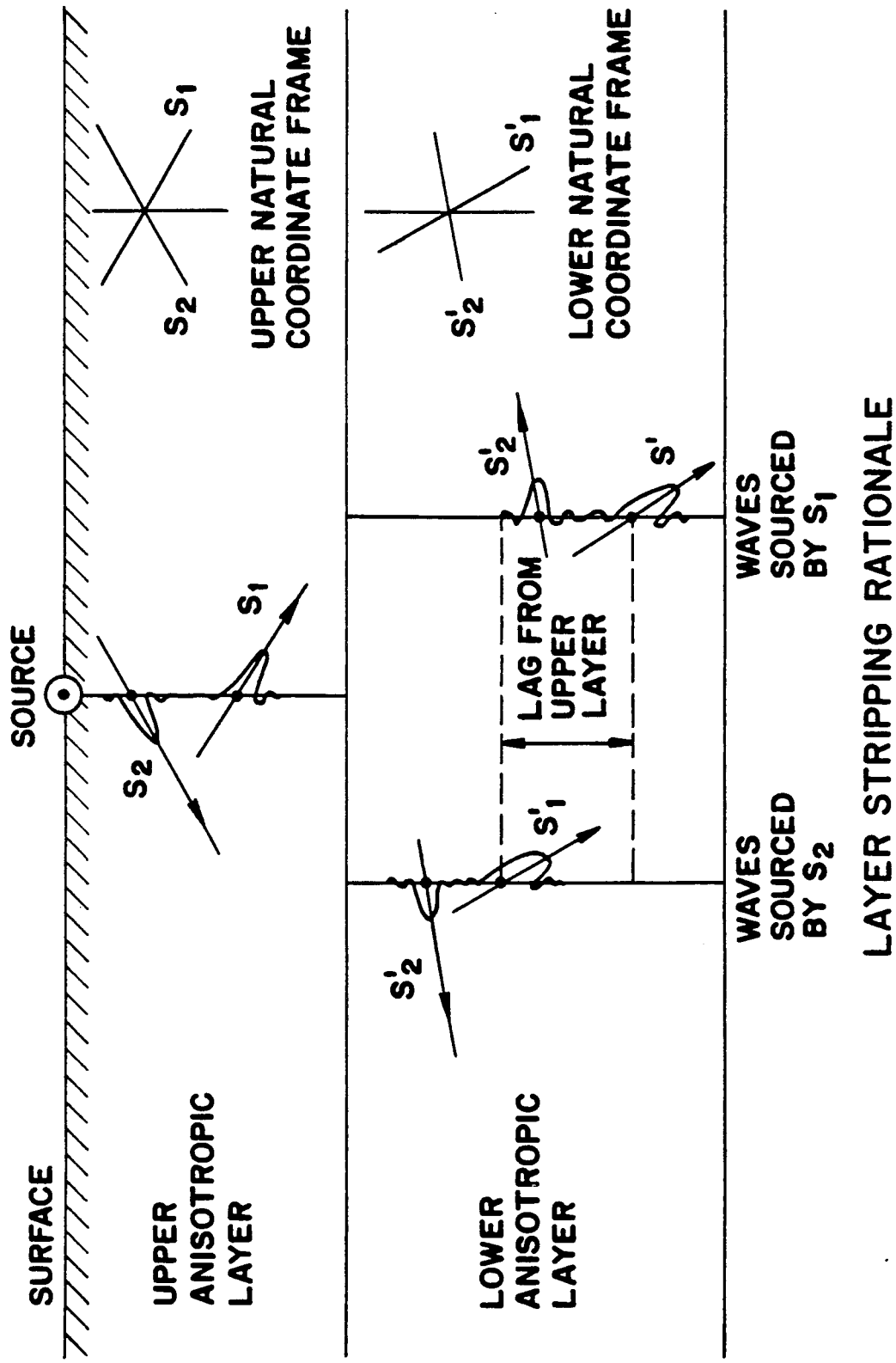
FIG_2 LAYER STRIPPING RATIONALE

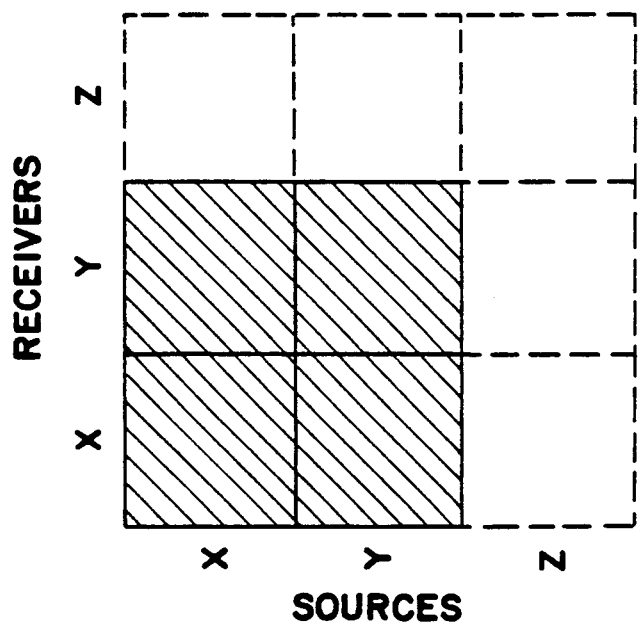
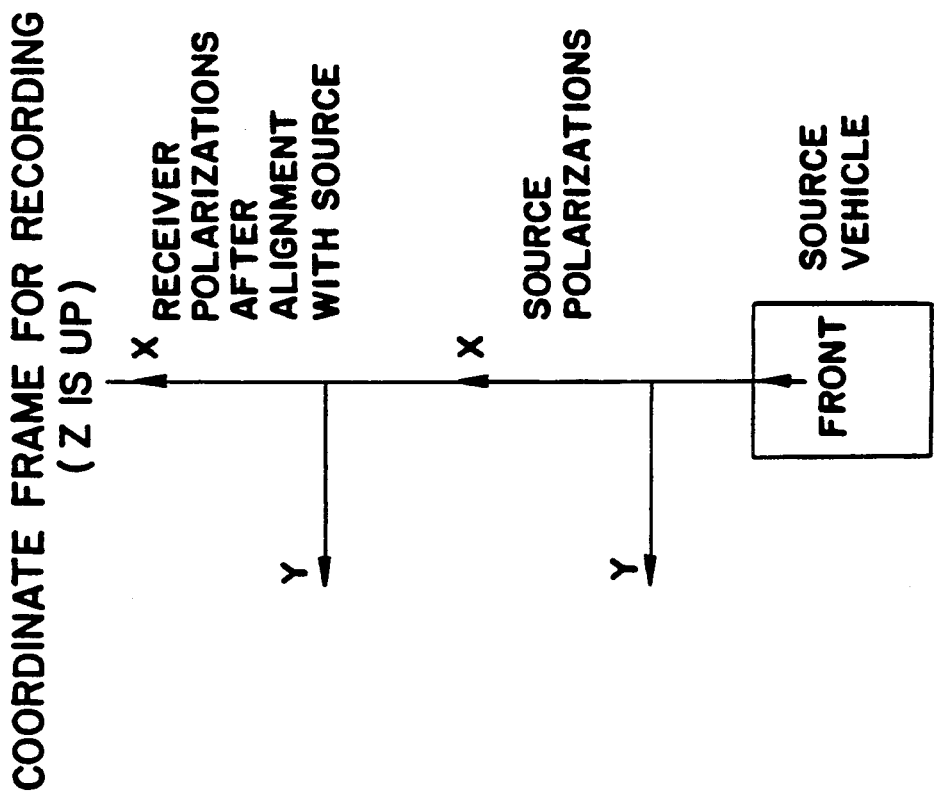
FIG_3

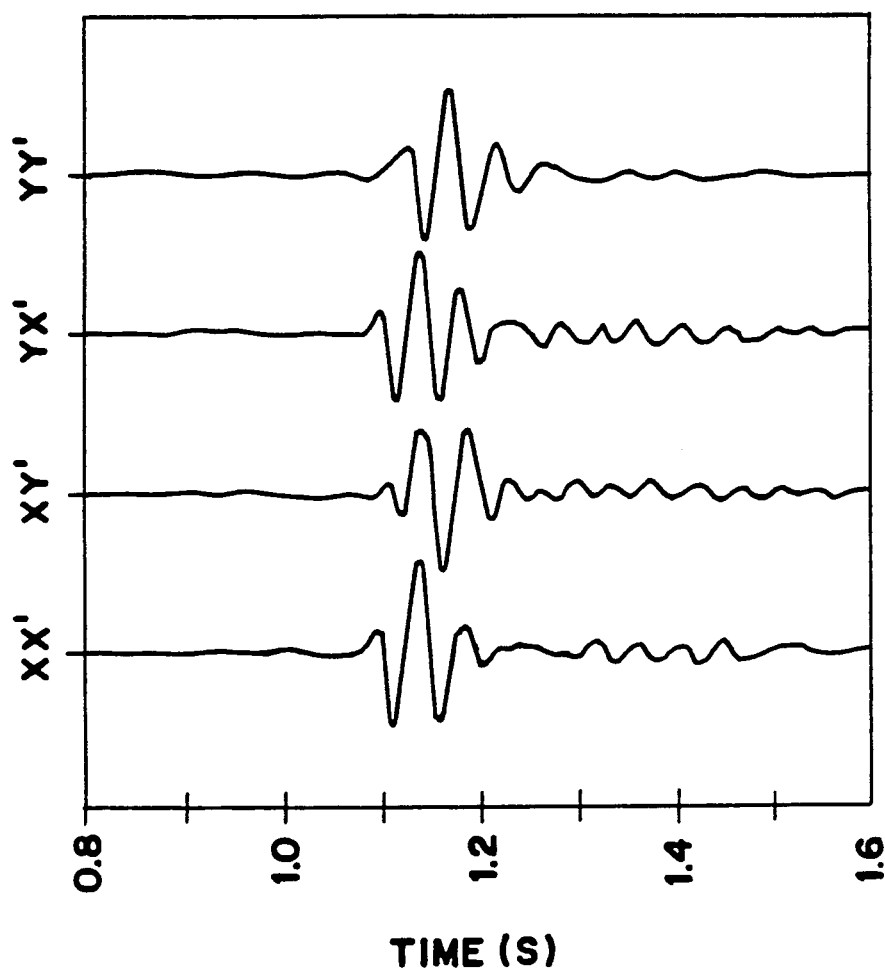
FIG_4
THE FOUR S-WAVE COMPONENTS FROM THE 1720 FT DEPTH OF THE 11-10X WELL

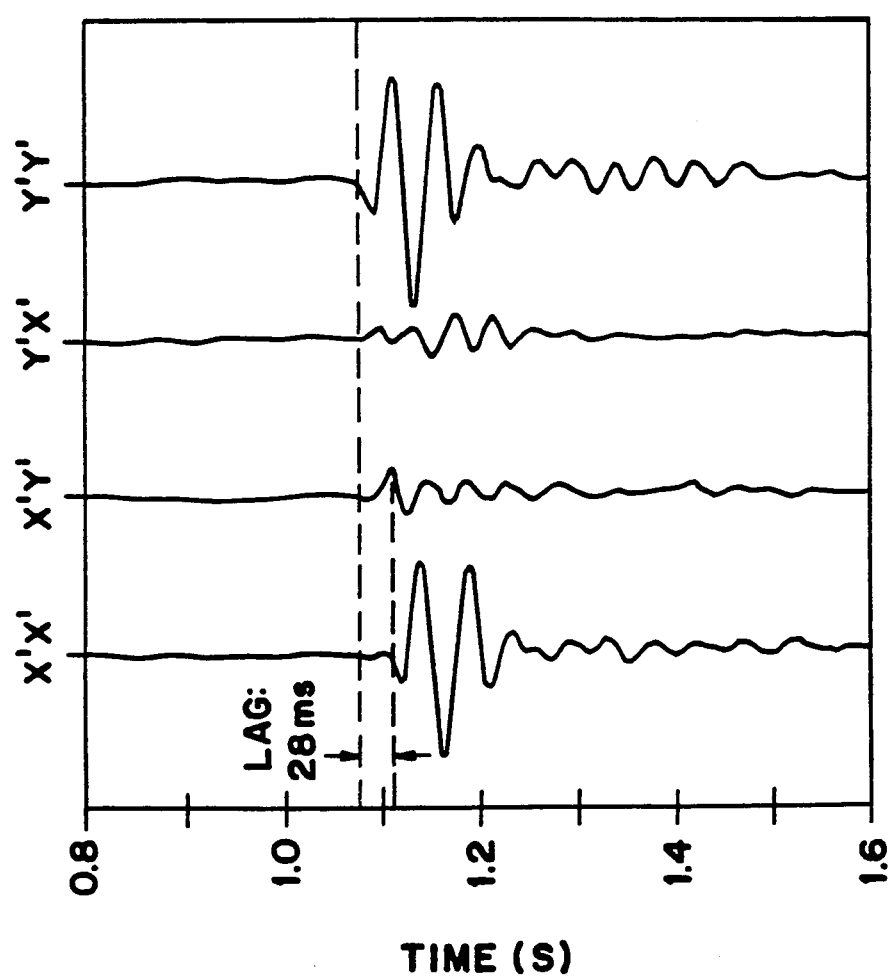

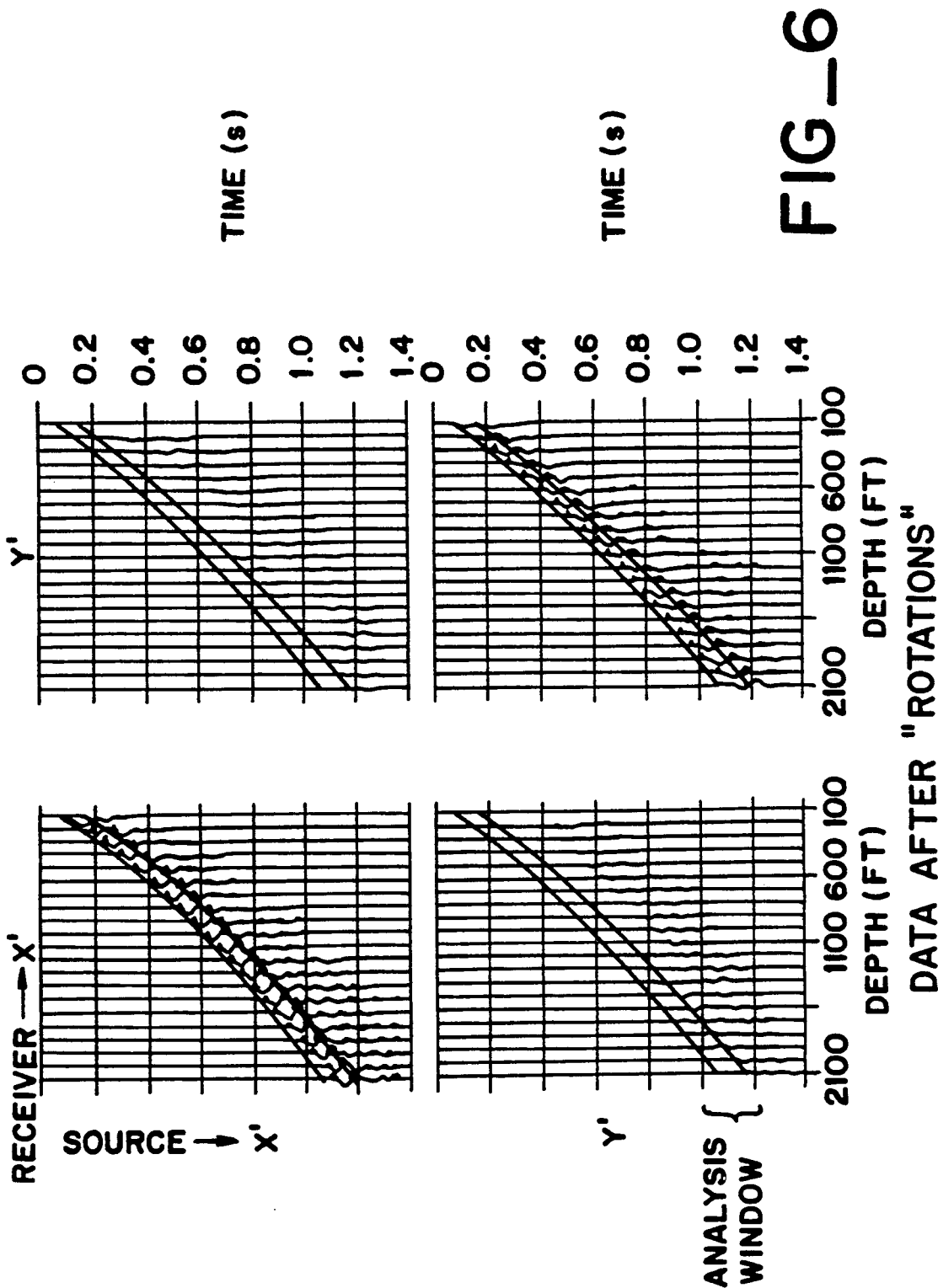
FIG_6

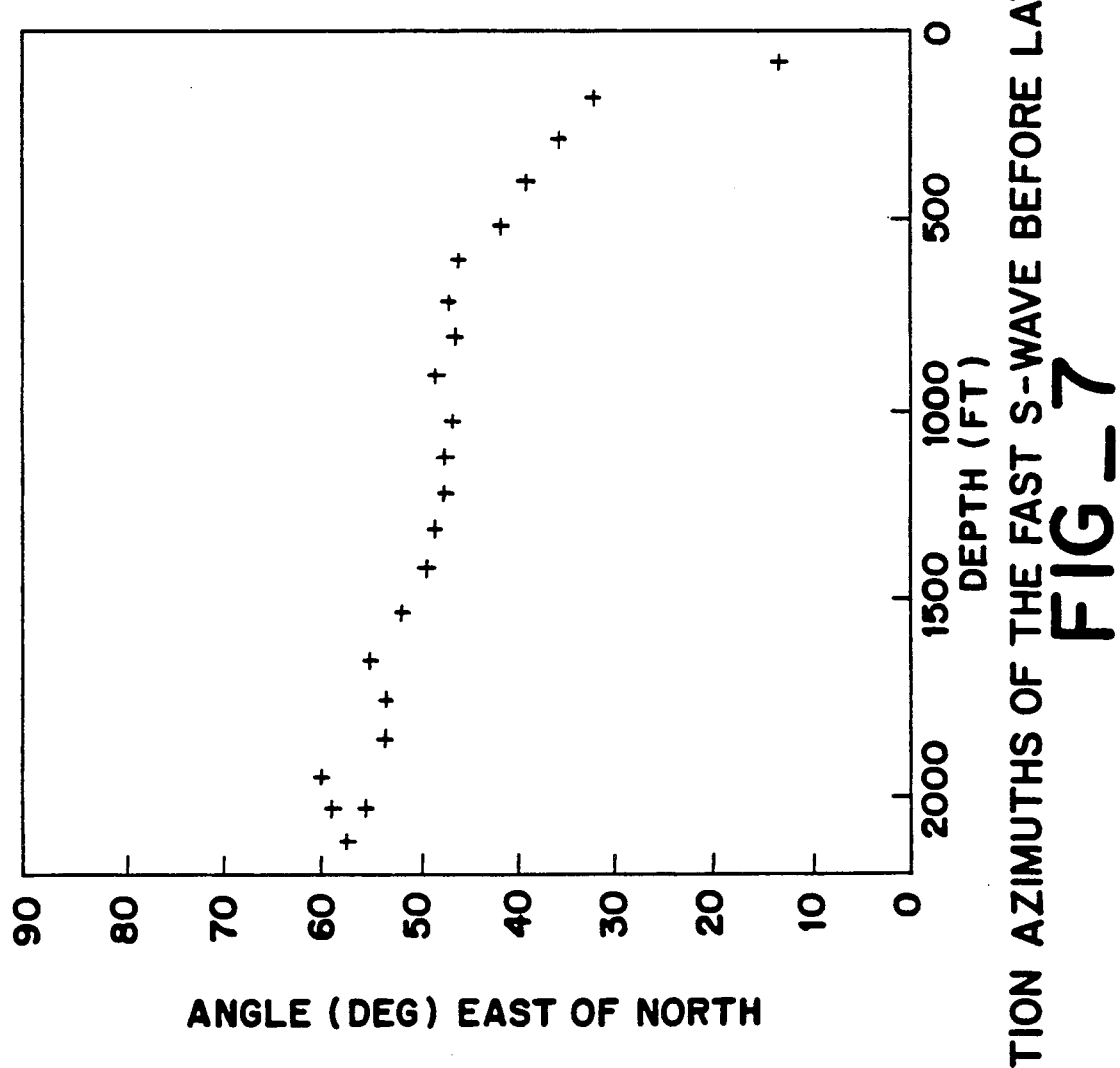

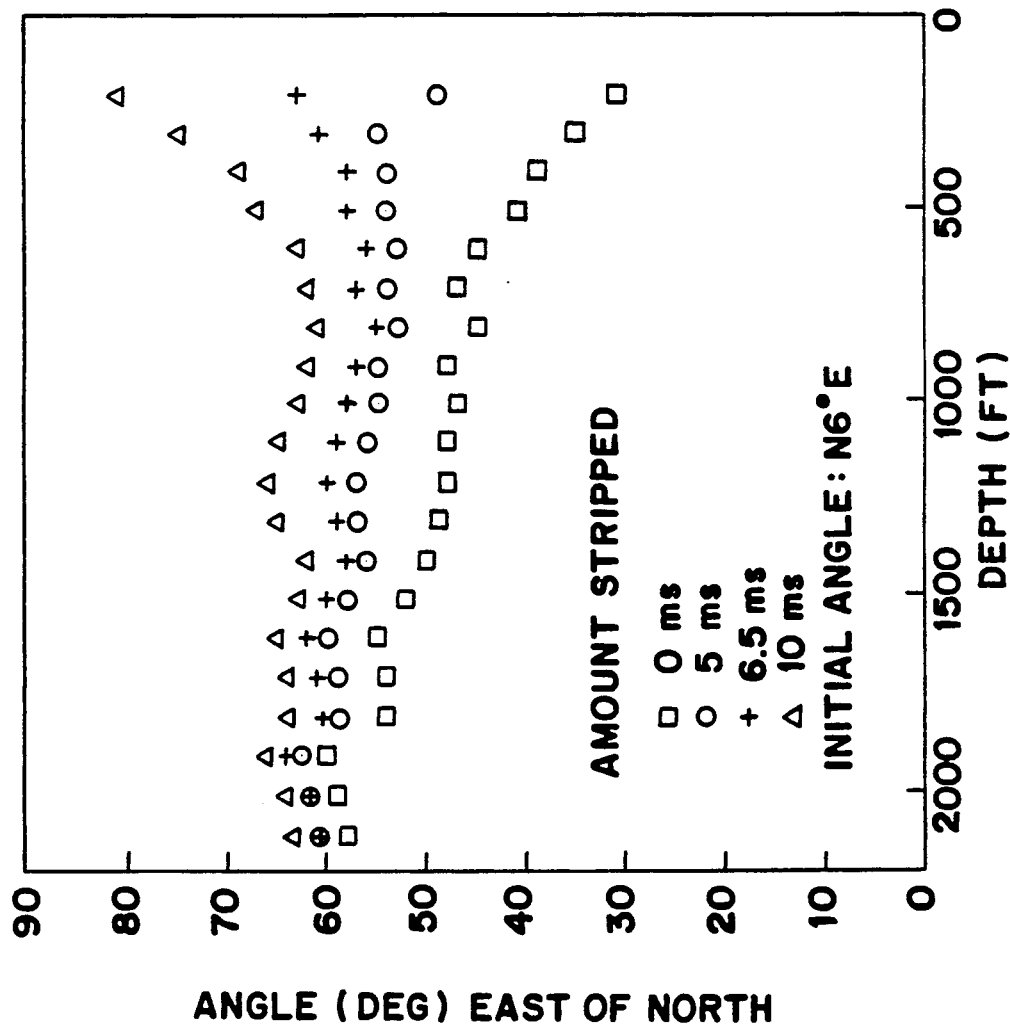
FIG_8
POLARIZATION AZIMUTHS OF THE FAST S-WAVE OF 1-9J VSP DATA AFTER STRIPPING OFF THE INDICATED LAGS

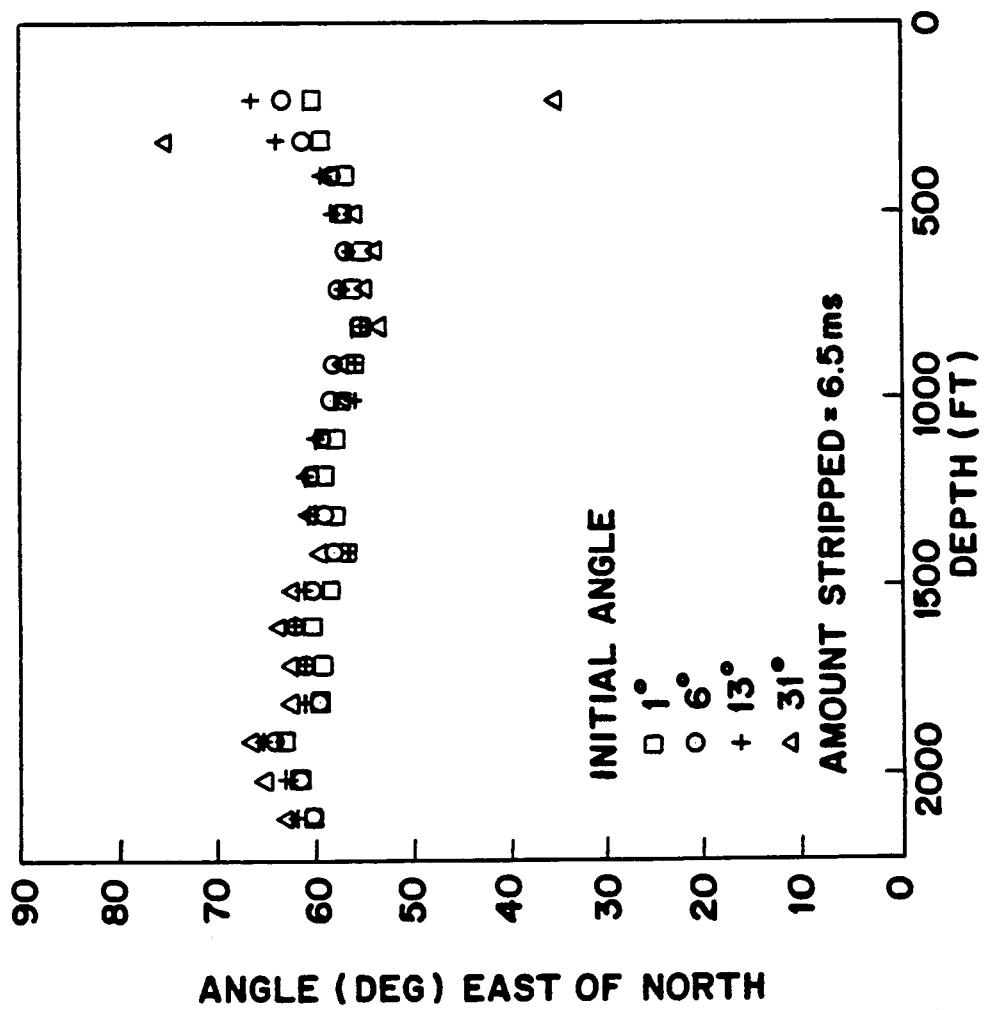

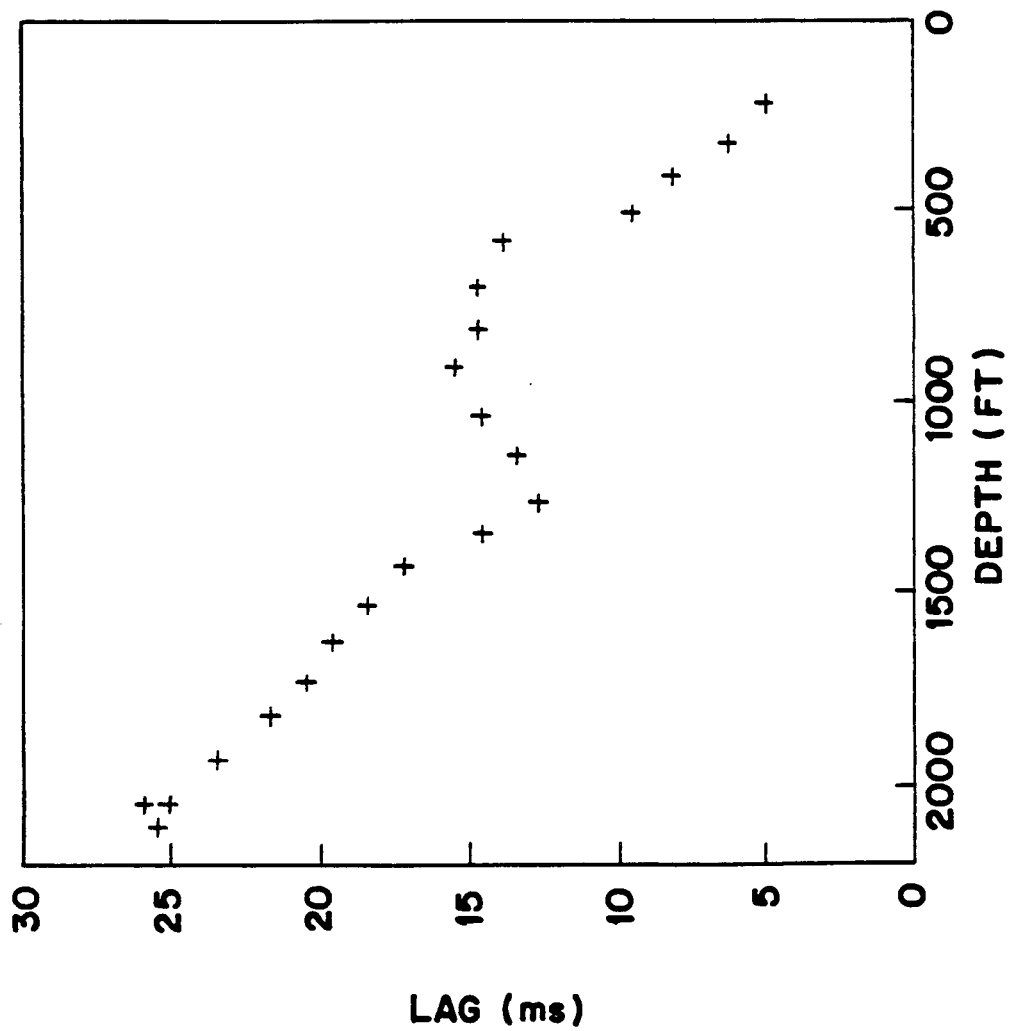
FIG_10
LAGS BETWEEN S-WAVES OF THE 1-9J VSP AFTER STRIPPING OFF THE THIN NEAR SURFACE LAYER

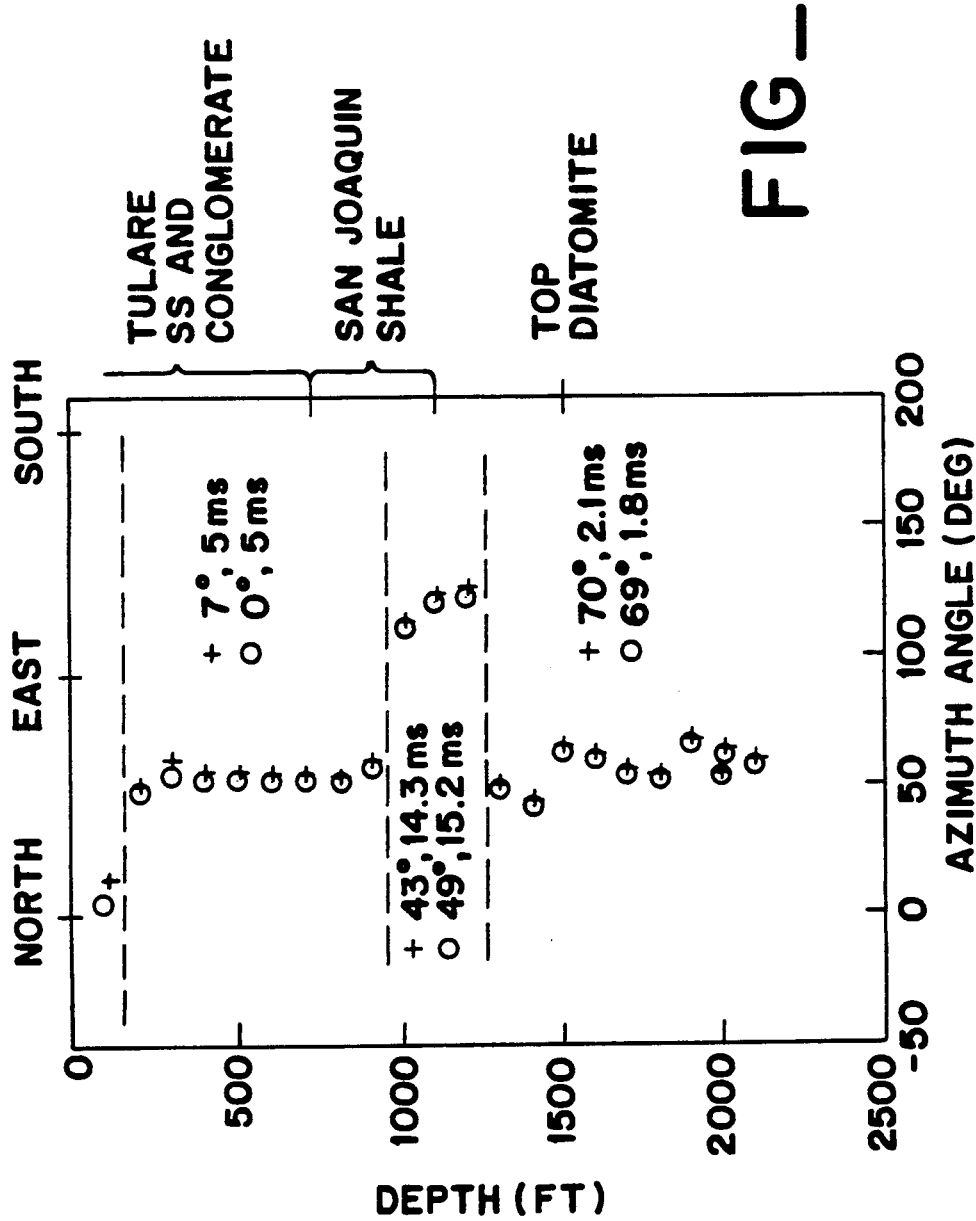
FIG_11
SUMMARY OF POLARIZATION ANGLES OF THE FAST S-WAVE VS DEPTH FOR TWO INDEPENDENT LAYER STRIPPING ANALYSES OF 1-9J VSP DATA

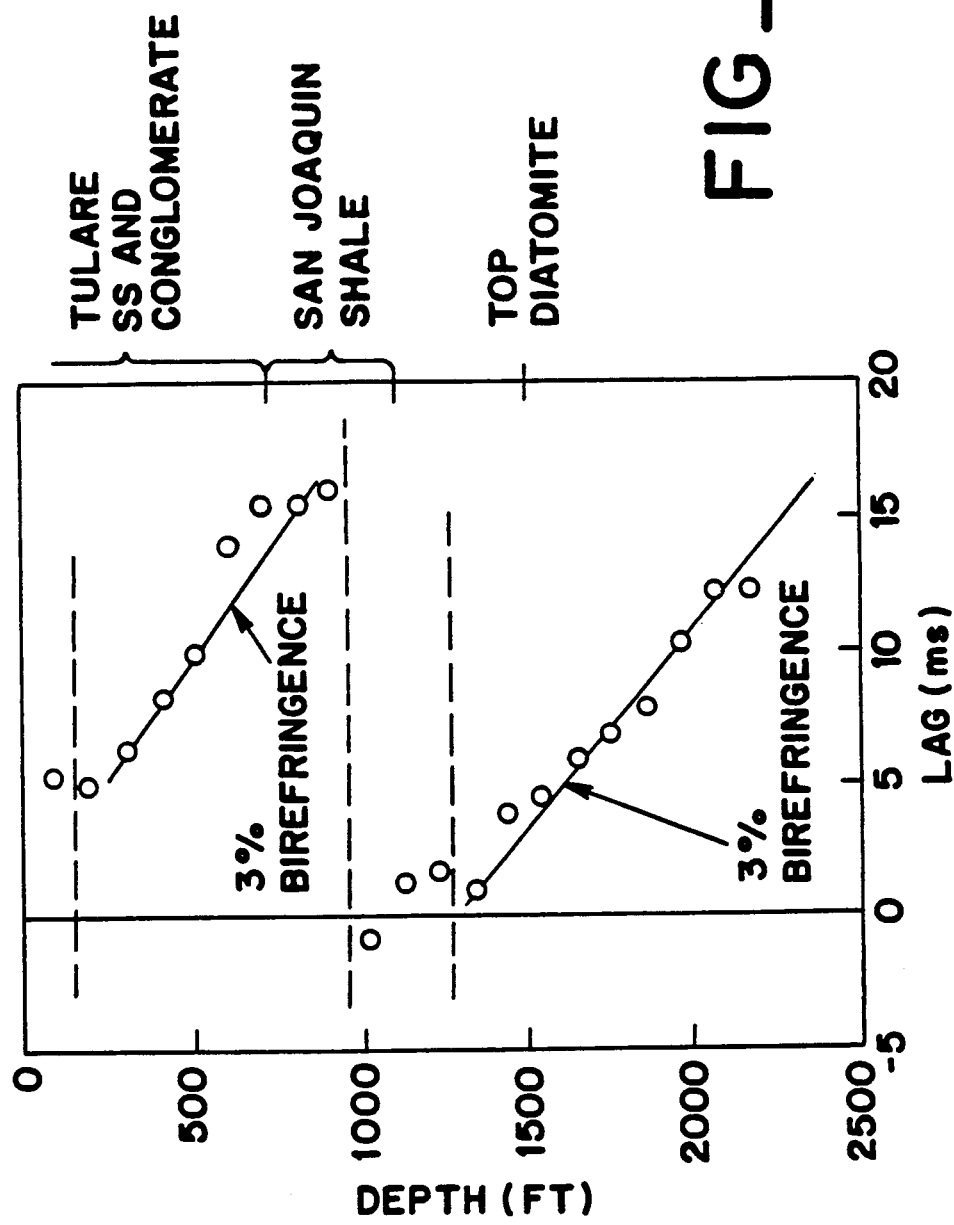
FIG_12
S-WAVE LAG VS DEPTH FOR THE LAYER STRIPPING SEQUENCE INDICATED BY CIRCLES IN FIGURE 11

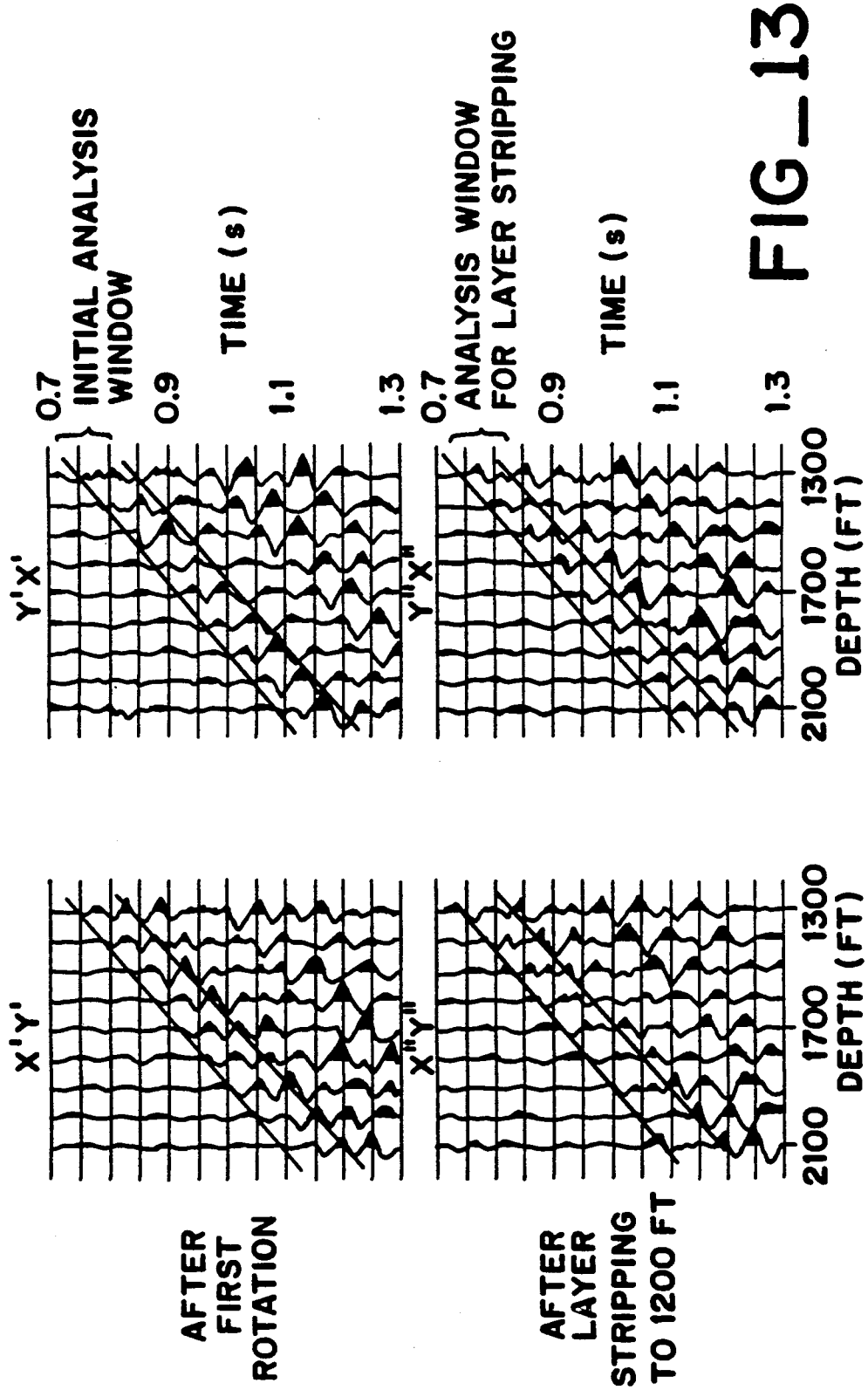
FIG_13
OFF-DIAGONAL COMPONENTS OF THE 2×2 S-WAVE DATA MATRIX OF THE 1-9J VSP BEFORE AND AFTER LAYER STRIPPING

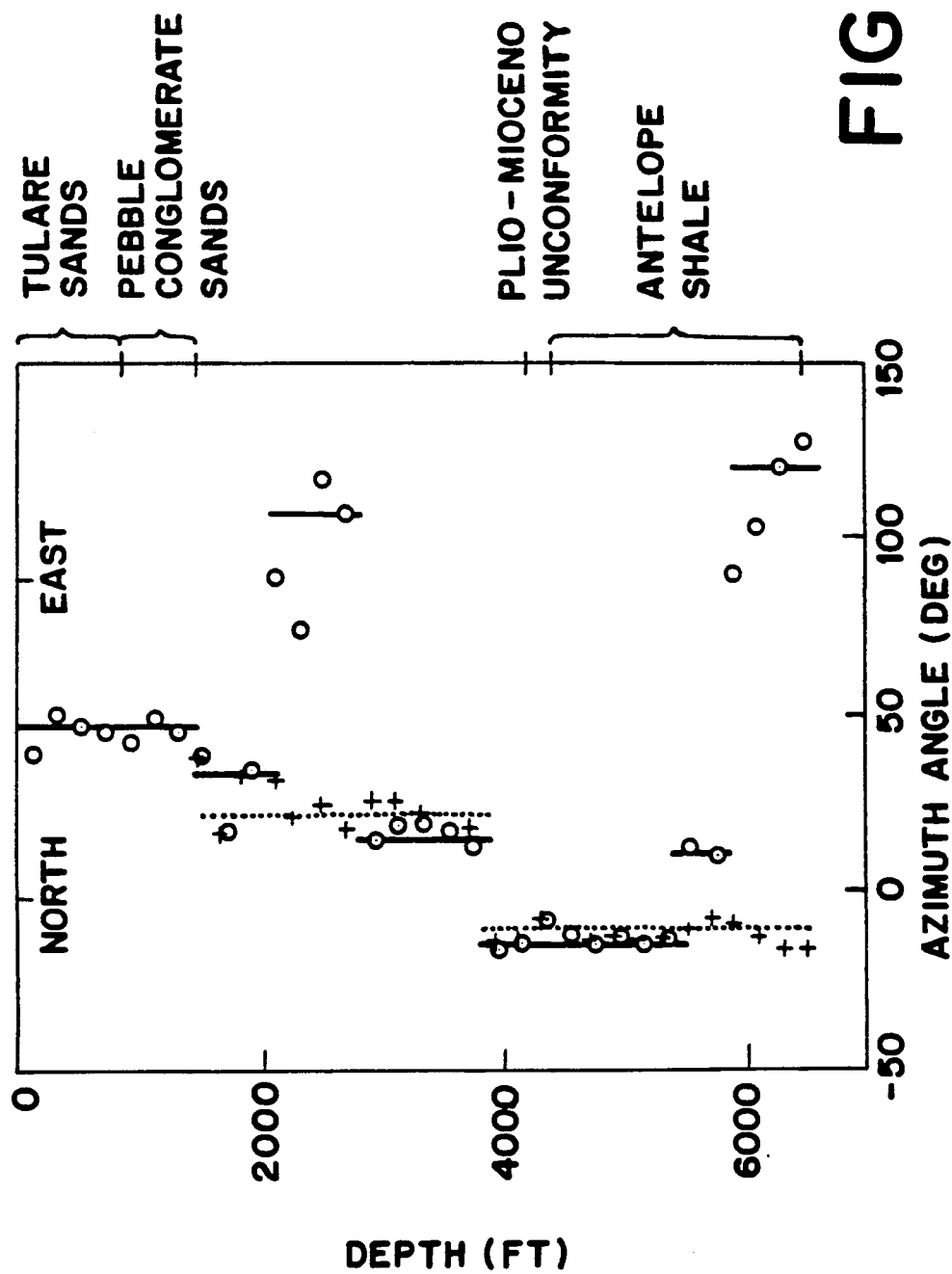
FIG_14
SUMMARY OF POLARIZATION ANGLES OF THE FAST S-WAVE VS DEPTH FOR THE RAILROAD GAP VSP DATE

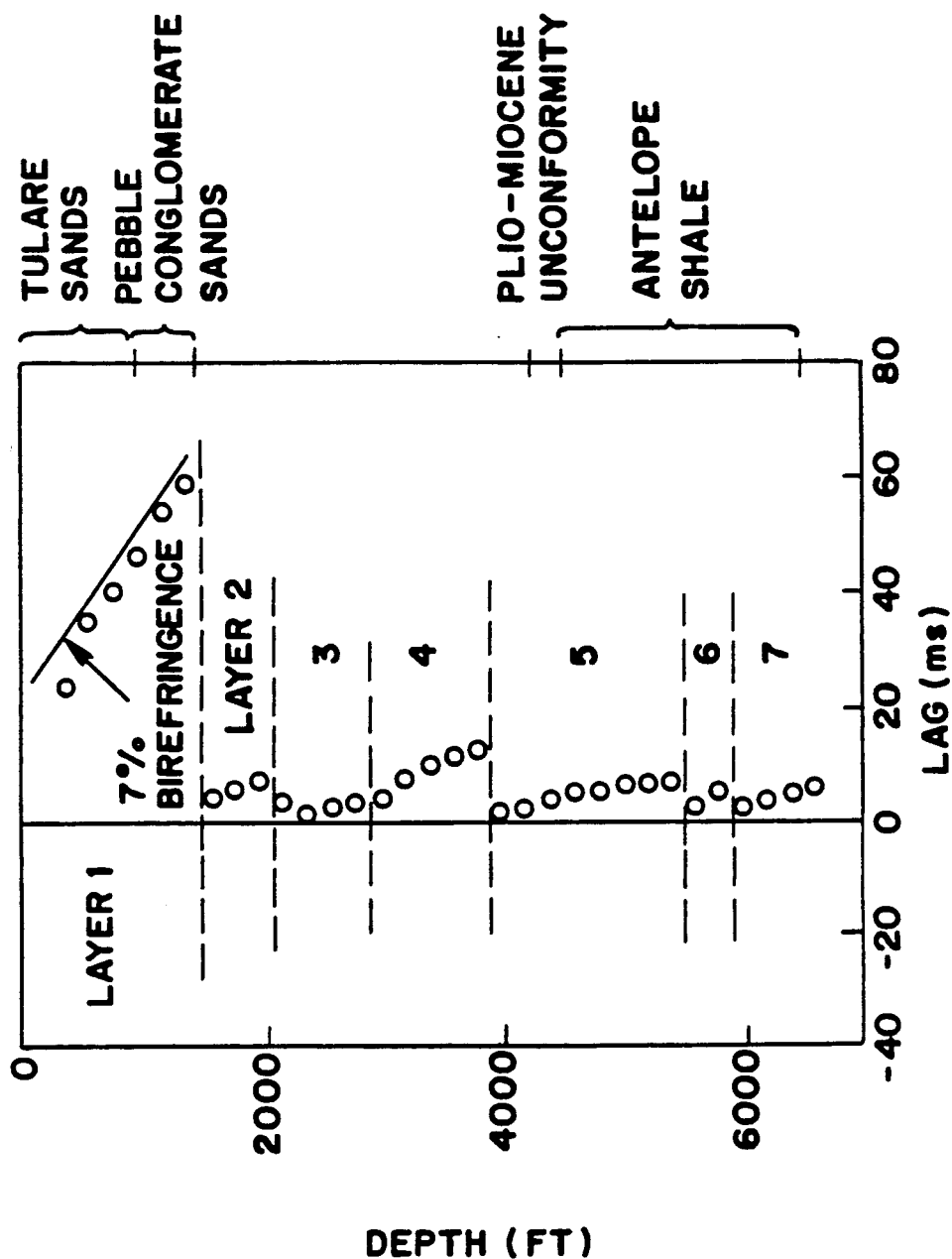
FIG_15
SUMMARY OF S-WAVE LAG VS DEPTH FOR THE RAILROAD GAP VSP DATA

METHOD OF LAYER STRIPPING TO DETERMINE FAULT PLANE STRESS BUILD-UP

FIELD OF THE INVENTION

The present invention relates generally to geophysical analysis of the subsurface of the earth. More specifically, this invention provides a method for reliably and accurately applying a layer stripping technique to determine fault plane stress build-up.

BACKGROUND OF THE INVENTION

Shear wave (S-Wave) seismic exploration techniques have historically employed shear wave seismic sources and shear wave seismic receivers in a seismic survey to gather seismic data. Such a seismic survey has been either linear or areal in its extent. The seismic energy imparted by the shear wave seismic source is detected by the shear wave seismic receivers after interacting with the earth's subterranean formations. Such seismic surveys, however, until recently have been limited to utilizing a shear wave seismic source having a single line of action or polarization, oriented with respect to the seismic survey line of profile, to preferentially generate seismic waves of known orientation, e.g., horizontal shear (SH) waves or vertical shear (SV) waves. The shear wave seismic receivers utilized in conjunction with a given shear wave seismic source have similarly been limited to a single line of action or polarization, oriented with respect to the seismic survey line of profile, to preferentially receive a single component of the seismic wave, e.g., (SH) wave or (SV) wave. As used herein, the term "line of action" generally comprehends a defined vector displacement, such as the particle motion of the seismic wave. In present shear wave seismic surveys, the lines of action of the seismic source and the seismic receivers usually have the same orientation relative to the line of profile and if so are said to be "matched".

The term "polarization" in the context of seismic waves refers to the shape and spatial orientation of particle trajectories. Here we restrict the term to mean only the spatial orientation of the line along which a particle moves in a linearly polarized wave. Hence "polarization" and "polarization direction", as used here, both imply the spatial orientation of such a line, the latter term emphasizing the restriction to linear rather than more general (e.g., elliptical) motion. A "polarization change", then, does not mean a change, for example, from linear to elliptical motion nor a polarity reversal but only a change in the spatial orientation of the line along which a particle moves.

As long as seismic surveys were limited to seismic sources and seismic receivers having a compressional (P) wave lines of action, satisfactory results were generally obtained irrespective of the orientation of the seismic survey line of profile with respect to the underlying geological character of the subterranean formations. However, when the seismic sources and seismic receivers are of the shear wave type, i.e., either horizontal shear (SH) wave or vertical shear (SV) wave, the orientation of the seismic survey line of profile and/or the line of action of the shear wave seismic source with respect to the geological character of the subterranean formations can determine whether or not meaningful seismic data is obtained.

As understood by those skilled in the art, compressional (P) waves are longitudinal waves where the particle motion is in the direction of propagation. Shear waves are transverse waves where the particle motion is in a transverse plane perpendicular to the direction of propagation. Two special classes of shear waves are defined herein. Specifically, horizontal shear (SH) waves where the particle motion in the transverse plane is further restricted to be perpendicular to the line of profile of the seismic survey (i.e., horizontal) and vertical shear (SV) waves where the particle motion in the transverse plane is further restricted to be perpendicular to the horizontal shear (SH) particle motion.

As the orientation of the seismic survey line of profile is dependent on the geological character of the subterranean formation, when matched shear wave seismic sources and shear wave seismic receivers are used, it is known by those skilled in the art that shear wave seismic surveys are adversely affected by azimuthally anisotropic subterranean formations. Azimuthally anisotropic subterranean formations are likely to have vertical planes of symmetry Because shear wave behavior is complicated and generally uninterpretable when the symmetry planes are neither parallel to nor perpendicular to the line of action of the shear wave, care must be taken to ensure that the seismic survey line of profile is laid out either parallel or perpendicular to the symmetry planes.

When the seismic survey line of profile is laid out either parallel or perpendicular to the symmetry planes, the utilization of matched sets of (SH) wave and (SV) wave seismic receivers and seismic sources have provided useful information regarding the geological character of a subterranean formation. Such a technique requires prior knowledge of the seismic velocity anisotropy of the subterranean formation to be successful.

The interaction differences of (SH) waves and (SV) waves have been utilized to detect and measure the anisotropic properties of an azimuthally anisotropic subterranean formation when the seismic lines of profile are properly oriented with respect to the symmetry planes and matched sets of shear wave seismic sources and shear wave seismic receivers have been deployed in the seismic survey. In such applications, (SH) and (SV) shear wave seismic sources and seismic receivers are utilized, but only in matched sets, i.e., (SH) shear wave seismic sources with (SH) shear wave seismic receivers and (SV) shear wave seismic sources with (SV) shear wave seismic receivers. However, if the seismic survey line of profile is not properly oriented with respect to the planes of symmetry, the seismic information observed can be difficult to interpret at best.

The orientation of the seismic survey line of profile with respect to the symmetry planes is critical. Consequently, utilization of matched sets of shear wave seismic sources and shear wave seismic receivers have produced inconsistent results when the seismic survey line of profile has not been properly laid out with respect to the anisotropic geological character of the subterranean formations.

Those acquainted with the art of seismic exploration, especially in seismically virgin territory, realized that prior knowledge of the geological character of the subterranean formations and associated fault plane stresses is generally not available prior to seismic exploration. The method and system of geophysical exploration of the present invention can be advantageously employed without regard to or knowledge of the geological character of the subterranean formations and still obtain meaningful seismic data.

U.S Pat. No. 3,302,164 relates to seismic exploration for detecting fluids in formations by obtaining a ratio of the velocities of shear waves and compressional waves along a seismic line of profile. In order for the ratio to be obtained, however, the frequency spectra of the waves introduced by a seismic source had to be controlled according to the average velocity ratio expected to be encountered. An article, "Combined Use of Reflected P and SH Waves in Geothermal Reservoir Exploration," Transactions of Geothermal Resources Council, Volume 1, May 1977, discussed tests made using both compressional and shear waves in exploring for and evaluating geothermal reservoirs.

U.S. Pat. No. 4,286,332 relates to a technique of propagating seismic shear waves into the earth from compressional wave producing vibrators. U.S. Pat. No. 4,242,742 describes a technique of obtaining shear wave seismic data from surveys where impact devices for waves are used as a seismic energy source.

S-wave birefringence, a property of elastic waves in anisotropic solids, is common for S-waves traveling vertically in crustal rocks. Early models of anisotropic sedimentary rocks proposed by exploration geophysicists were often transversely isotropic with vertical infinite-fold symmetry axes. Such solids are not birefringent for S waves with vertical raypaths. Earthquake seismologists (e.g., Ando et al., 1983; Booth et al., 1985), however, found near-vertical S-wave birefringence in earthquake data in the early 1980s. At the same time, oil companies recording three-component (3-C) seismic data independently found vertical birefringence in hydrocarbon-bearing sedimentary basins. (Winterstein). Researchers from Amoco, Exxon, Chevron and Colorado School of Mines documented this vertical birefringence for the first time publicly in 1986 at annual meetings of the EAEG and SEG (e.g., Alford, 1986; Willis et al., 1986; Becker and Perelberg, 1986; Frasier and Winterstein, 1986; Martin et al., 1986). Since then much additional evidence for vertical birefringence in sedimentary basins has accumulated (e.g., Squires et al., 1989).

A common model for vertical S-wave birefringence is extensive dilatancy anisotropy (EDA) proposed by Crampin et al. (1984). The essential feature of this model is that horizontal stresses such as those from plate tectonics create vertically oriented, fluid filled cracks or microcracks which cause anisotropy that, unlike transverse isotropy with a vertical axis, will cause vertical S-wave birefringence. The validity of EDA as an explanation for vertical birefringence is not established, but it and variants of it have proved useful as a framework within which to record and interpret experimental data. An alternate model, which we call the Nur model (Nur, 1971; Nur and Simmons, 1969), proposes the unstressed rock is isotropic with a uniform distribution of randomly oriented cracks. Axial stresses preferentially close the cracks perpendicular to stress directions, making the rock anisotropic. It is almost certain, whatever the best model proves to be, that much of the observed vertical S-wave birefringence results in some way from horizontal stresses. Crampin and Bush (1986) also pointed out that vertical S-wave birefringence might provide a useful tool for reservoir development. The polarization direction of the fast S wave in simple cases gives the direction of maximum horizontal compressive stress, a quantity much in demand by those who induce fractures in reservoirs by techniques such as hydraulic fracturing.

Available evidence, (discussed later), including offset VSP information supports the notion that the vertical S-wave birefringence is caused by horizontal stresses, and that the polarization direction of the fast S wave lies in the direction of maximum horizontal compressive stress, even when subsurface structures are steeply dipping. It is likely however that rocks exist for which the polarization direction of the fast S-wave for vertical travel does not lie along the maximum horizontal stress direction. Rocks with fractures oriented by ancient stress regimes, or rocks of low symmetry with tilted symmetry axes, for example, might constrain the fast S-wave polarization to lie in a direction other than that of maximum horizontal stress.

Unmistakable evidence is hereby presented for major changes in S-wave polarization direction with depth (see also Lee, 1988). A relationship between these polarization changes and any change of horizontal stress direction certainly exists, and the S-wave birefringence data provide potentially useful information for reservoir development regardless what the relationship is. U.S. Pat. Nos. 4,803,666 and 4,817,061 (both to Alford) are hereby incorporated by reference. Alford discloses a method of determining the S-wave polarization angles by finding the angle at which S-wave energy on off-diagonal components of an S-wave data matrix was at a minimum. One implementation of Alford's method involves selecting time windows that include only the leading portions of the first arrival S-waves, and then calculating energy on the off-diagonal components at rotation angle increments of one degree.

However, an invalid assumption of Alford's rotation method is that S-wave polarizations along a given raypath are generally orthogonal. Such an assumption is strictly valid only in certain symmetry directions. The effectiveness of Alford's method is hindered by noise or by distortion of the signal on the off-diagonal components of the S-wave data matrix.

Accuracy of analysis by Alford's rotation method depends, at least in principle, on having signal amplitudes of off-diagonal XY and YX components identical at common times. If they are not identical, the data do not fit the model, and the matrix cannot be diagonalized by a single rotation of source and receiver coordinate frames. If signal on XY components differs systematically from that on YX components, there will be systematic errors in calculated azimuth angles. But changes of polarization with depth cause just such systematic differences in signal on XY and YX components; specifically, the signal on one of the two components lags that on the other by the amount imposed by the upper layer.

Lefeuvre et al. (1989) and Cox et al. (1989) used propagator matrices or transfer functions to analyze variations in S-wave birefringence with depth in multicomponent VSP data, instead of applicant's proposed method of layer stripping. These prior works utilize only a Fourier spectrum as an analytical method. Therefore, improvements in the S-wave data cannot be readily seen, and the quality of the improvements do not match applicant's results. Being able to see the improved wavelet (as with applicant's method) provides confidence to the analyst, as it provides information on how well the process is working.

Martin et al. (1986) analyzed changes in S-wave birefringence with depth in S-wave surface reflection data via a rudimentary layer stripping technique. They subtracted the effects of an upper layer to see the residual effects in a lower layer. Their approach, however, required the generally unwarranted assumption that symmetry planes in a deeper layer were orthogonal to those in an upper layer. That is, they did not perform any analysis to determine the actual orientation of the deeper symmetry planes.

Current methods of predicting subsurface fracture orientation and determining fault plane stress build-up fall short of providing accurate results, for the many reasons described above. There is therefore a need for an improved seismic method to evaluate changes in shear wave polarization with depth, to determine fault plane stress build-up.

SUMMARY OF THE INVENTION

The present invention has been surprisingly successful in improving the analyses of seismic shear wave data to determine fault plane stress build-up. Vertical seismic profile shear wave data or surface seismic reflection shear wave data has at least two linearly independent, nearly orthogonal, and nearly horizontal source axes. Each source axis has at least two corresponding receiver axes. An initial analysis of shear wave polarization directions relative to a fixed coordinate frame is then performed, and apparent time lags between fast and slow shear waves are determined at several depths. Cues in the data are identified that suggest shear wave polarization changes.

The natural polarization directions of and the time lag between the fast and slow shear waves in an upper layer are determined, above and adjacent to the shallowest depth where the cues suggest polarization changes. Other depths may be used as well, even if no cues suggest polarization changes. The source and receiver axes of all the data that are below or at the shallowest depth of indicated polarization changes are then rotated by an azimuth angle determined down to this depth, so that the first source and receiver axes are aligned with the natural polarization direction of the fast shear wave, and the second receiver axis is at a significantly different azimuth angle, and so that if there is a second source, the second source and first corresponding receiver axis are aligned with the natural polarization direction of the slow shear wave in the upper layer, while the second corresponding receiver axis is at a significantly different azimuth angle.

A static shift is then applied to all data components corresponding to one of the effective sources, either to components corresponding to the source aligned with the fast shear wave polarization direction, or to components corresponding to the source aligned with the slow shear wave polarization direction, to eliminate the time lag in the upper layer above and adjacent to the shallowest depth where the cues suggest polarization changes are indicated or suspected.

Shear wave polarization azimuth angles are then determined for the shallowest depth where polarization changes are indicated. These azimuth angles are then compared to the strike of a selected fault which is near enough to be effected by compressional or tensional stress which is associated with the azimuth angles. Time lags between the fast and slow shear waves are determined at least at one depth in the upper layer.

The above steps are then repeated at a later time, to evaluate time varying changes in the shear wave polarization azimuth angles, or in the time lags between the shear waves. Further shear wave polarization changes can be evaluated by repeating all of the above.

The invention may also be used for vertical seismic profile (VSP) data or surface seismic reflection data that has only a single source axis. Only the receiver axes are rotated in this case.

If surface seismic reflection shear wave data is analyzed, one variation of the disclosed method includes an initial analysis of shear wave polarization directions relative to a fixed coordinate frame in similarly recorded VSP data from a nearby well, and the subsequent determination of the time lags.

A further variation of the invention permits analysis of surface seismic reflection shear wave data without the use of VSP data.

DETAILED DESCRIPTION OF THE DRAWINGS

FIG. 1 is a sectional view of the earth, illustrating the basic model for VSP shear wave recording.

FIG. 1a is a sectional view of the earth, illustrating the natural coordinate frame for vertical shear waves.

FIG. 2 is a sectional view of the earth illustrating the basic layer stripping rationale.

FIG. 3 is a plan view of the earth, illustrating the coordinate frame for recording and processing shear wave data, and the meaning of the 2×2 shear wave matrix.

FIG. 4 shows the four shear wave components from the 1720 ft level of well 11-10X.

FIG. 5 shows the four shear wave components of FIG. 4 after "rotation".

FIG. 6 shows shear wave data from well 1-9J after "rotation".

FIG. 7 is a chart that illustrates polarization azimuths of the fast shear waves before layer stripping at the 1-9J well.

FIG. 8 is a chart that illustrates the polarization azimuths of the fast shear wave of the 1-9J well after layer stripping.

FIG. 9 is a chart that illustrates the polarization azimuths of the fast shear wave of the 1-9J well as a function of the initial rotation angle.

FIG. 10 is a chart that illustrates variations in shear wave lags with depth, at the 1-9J well, after stripping off the near surface layer.

FIG. 11 is a chart that shows a summary of polarization angles of the fast shear waves with depth, for two independent layer stripping analyses of the 1-9J well VSP data.

FIG. 12 is a chart that shows shear wave lag with depth, for the layer stripping sequence indicated by circles in FIG. 11.

FIG. 13 compares off-diagonal components of the 2×2 shear wave data material of the 1-9J well before and after layer stripping.

FIG. 14 is a chart that illustrates the polarization angles of the fast shear wave versus depth for the Railroad Gap VSP data.

FIG. 15 is a chart that illustrates the shear wave lag versus depth for the Railroad Gap VSP data.

DETAILED DESCRIPTION OF THE INVENTION

In accordance with the present invention, a new improved method and means for using layer stripping to determine fault plane stress build-up has been developed.

The objective of the data analysis described herein is to quantify subsurface shear wave (or S-wave) birefringence or, in other words, to find the natural polarization directions of the two S-waves and the time delays or lags between them, which indicates the direction of fault plane stress. Natural polarization directions are directions along which anisotropic rocks constrain polarizations of S-waves to lie. The purpose of the analysis is to correlate birefringence effects with formation properties such as direction of maximum horizontal stress. FIGS. 1 and 1a illustrate the basic model in simplest terms. An arbitrarily oriented horizontal displacement from a surface source propagates in the vertical direction as a fast S-wave ($S_1$), and a slow S-wave ($S_2$), with $S_1$ polarized along the direction of maximum horizontal compressive stress.

The term "polarization" in the context of seismic waves refers to the shape and spatial orientation of particle trajectories. The term is restricted to mean only the spatial orientation of the line along which a particle moves in a linearly polarized wave. Hence "polarization" and "polarization direction", as used here, both imply the spatial orientation of such a line, the latter term emphasizing the restriction to linear rather than more general (e.g. elliptical) motion. A "polarization change", then, does not mean a change, for example, from linear to elliptical motion nor a polarity reversal but only a change in the spatial orientation of the line along which a particle moves.

For arbitrary ray directions in anisotropic rocks of low symmetry, a great deal of information is needed to interpret S-wave time lags and polarizations. However, if the rocks have vertical twofold symmetry axes, analysis is straightforward if raypaths are vertical, and polarization directions relate in simple ways to symmetries of the rocks. An initial assumption is that the rocks have vertical symmetry axes and that their symmetry properties do not change with depth. Hence, in order to have raypaths as close to the symmetry axis as possible, the near offset sources are positioned as close to the wells as possible. Concentric rings of offset VSPs serve primarily as a check on our assumption of a vertical symmetry axis. That is, modeling showed that if the vertical direction is not a symmetry axis, S-wave polarizations at small offsets can vary asymmetrically with azimuth if the rocks are of orthorhombic or lower symmetry, even if there is a set of vertical cracks. On the other hand, if there is a vertical twofold symmetry axis, such S-wave polarizations will have twofold symmetry.

To determine natural polarization directions of the subsurface rock, several different rotation methods can be applied, as well as hodogram analyses. The most reliable method in our experience is to find the angle at which S-wave energy on off-diagonal components of the 2×2 S-wave data matrix is a minimum, a method we call the "rotation" method developed by Alford. All other methods had significant deficiencies. The "rotation" method can be implemented by choosing time windows that include only the leading portion of the first arrival S-waves and then calculating energy (sums of squares of amplitudes) on the off-diagonal components at rotation angle increments of one degree. Only the leading portions of wavelets need to be included because earlier observations showed that, after rotation to the angle which minimized off-diagonal energy, the codas of diagonal wavelets differed from one another much more than did their leading edges. Hence, the leading edges are much more interpretable than the codas. The use of time windows provides a considerable signal-to-noise ratio (S/N) advantage over methods which calculate from individual points, and lends stability and consistency to the answers. In most cases results are insensitive, within limits, to the length of the time window.

An assumption of the "rotation" method, generally not valid, is that S-wave polarizations are orthogonal. However, the assumption is strictly valid along any twofold symmetry axis and is a good approximation close to such an axis. Seismic sources can be rotated by the same angle as receivers, which is appropriate for vertical rays along vertical symmetry axes in homogeneous anisotropic media. The differences in arrival times of fast and slow S-waves (the lags) can be computed by crosscorrelating waves on the 2×2 S-wave matrix diagonals after rotating to the angle that minimized off-diagonal energy. Lag is observed to increase linearly with depth in a homogeneous, birefringent rock.

S-wave polarization directions were expected to remain constant with depth, but data analysis showed convincingly that they did not. Polarizations at Lost Hills field changed relatively little; and if we had considered only Lost Hills data, we probably would not have deemed it necessary to deal with polarization changes with depth. Polarization changes in Cymric and Railroad Gap fields to the south, however, were large and unmistakable, and a layer stripping method developed for data from those areas proved useful also for Lost Hills data.

Layer stripping involves simply subtracting off anisotropy effects in a layer in order to analyze anisotropy effects in the layer immediately below. That is, S-wave splitting is cumulative, so that if anisotropy changes with depth, effects of anisotropy above the change, unless removed, will persist in the changed region and will confuse an analysis there Although polarization will change instantly when a wave enters a region with different natural polarization directions, recorded wavelet shapes change slowly and preserve information about their past travels through other regions. Hence, if in polarization analysis one uses a significant fraction of an arriving wavelet, as is done here, rather than just its "first arrival", which no one can accurately pick in real data, one sees the effects of present as well as past polarizations.

What specifically hurts the effectiveness of the "rotation" method below a polarization change is distortion of signal on the off-diagonal components of the 2×2 S-wave data matrix. Accuracy of analysis by the "rotation" method depends, at least in principle, on having signal amplitudes of off-diagonal XY and YX components identical at common times If they are not identical, the data do not fit the model, and the matrix cannot be diagonalized by a single rotation of source and receiver coordinate frames. If the signal on XY components differs systematically from that on YX components, there will be systematic errors in calculated azimuth angles. But changes of polarization with depth cause just such systematic differences in signal on XY and YX components; specifically, the signal on one of the two components lags that on the other component by the amount imposed by the upper layer. This point can be understood by visualizing how wavelets in the lower layer of FIG. 2 project onto natural coordinate axes of the upper layer.

The inventive layer stripping process assumes certain subsurface properties. For example, S-wave polarizations must remain practically constant in a given layer. Polarizations hence are assumed to change discontinuously at layer boundaries, and time lag in a given layer increases monotonically from zero at the upper boundary to some finite value at the lower boundary. If polarizations were to change continuously with depth, the meaning of polarization analyses after layer stripping would be unclear. Also, each layer must be thick enough, and its birefringence large enough, to determine the correct polarization direction and maximum lag for that layer. In our implementation, wave propagation is assumed to be close enough to a symmetry direction in every layer so that rotation of sources and receivers by a single angle can do a good job of diagonalizing the 2×2 S-wave data matrix.

To subtract off effects from above the depth at which polarization change occurs, all the data from below that depth is rotated by the azimuth angle determined down to that depth and then a static shift is applied to remove the time lag between the two S-waves at that depth, as shown in FIG. 2. The $S_1$ and $S_2$ waves of the upper layer of FIG. 2 will act as independent sources, generating two sets of $S_1'$ and $S_2'$ waves at the interface. Layer stripping removes the time delay between the two effective sources at the interface, causing the primed waves ($S_1'$ and $S_2'$) to behave as if the interface had been at the surface. The process simulates putting a source at the depth where the polarization change occurs, such that the simulated source polarizations are oriented along natural polarization directions (assumed orthogonal) of the upper medium. After layer stripping, rotation analysis is repeated as before, and further layer stripping (i.e., "downward continuation") is applied if, for example, cues in the data indicate further polarization changes.

These layer stripping principles apply equally to surface seismic reflection data, but layer stripping will be less effective with reflection data because (1) signal-to-noise ratios are lower than in direct arrival VSP data, and (2) reflection events, which the method must rely on, do not necessarily occur close to where polarization changes occur. It may often be necessary to use information from VSPs to layer strip surface seismic data.

Layer stripping, in contrast to methods involving the calculation of propagator matrices or transfer functions from depth to depth, typically expects the user to judge where to do the stripping on the basis of a preconceived model; that is, he should have criteria in mind for judging from analysis results where polarization directions change. Despite the more subjective nature of layer stripping vis a vis calculating transfer functions, several possible advantages exist. First, layer stripping keeps the user's focus on the geophysical objectives rather than details of calculations. Second, the user is able visually to evaluate effects of stripping over large blocks of levels; this enables him to identify trends and changes in trends without extra effort and thereby to pick layer boundaries perspicaciously. Third, layer stripping improves the quality of data for general interpretation.

It is usually necessary in any case to treat data in blocks of several levels at a time, because it is impossible to determine birefringence effects if the two S waves have not traveled long enough in the birefringent medium to have accumulated a significant difference in arrival times. In noisy data, the robustness of birefringence analysis is aided by large lags between S waves.

Cues that S-wave polarization directions have changed manifest themselves as persistent changes with depth, in either the azimuth angles or the rate of change in time lags. Calculated azimuth angles tend to be insensitive indicators of polarization change below a thick, birefringent layer because properties of the S-wave wavelets remain much the same below the interface as they were above it, and the angles from rotations consequently tend to remain the same for some distance below the change. In other words, S-wave splitting generates a kind of inertia in azimuth angle determinations. Lags, in contrast, are often sensitive indicators of change: If polarization direction changes, the rate of increase in lag usually changes abruptly, and thus serves as the interpreter's principal indicator of polarization change.

The procedure for layer stripping under normal circumstances may be described in the following manner. The first step is to rotate source and receiver axes, say the x-axes, into alignment with the natural polarization direction of the fast S-wave in the upper layer. The rotation is applied to all data at and below the level where the polarization changes We denote this as a rotation from the x-y coordinate frame, which is the initial coordinate frame of the sources, into x'-y' frame, the frame of the S-wave polarizations. The rotation simulates lining up the x source polarization along the direction of the fast S-wave polarization of the upper layer. Ideally, after this rotation, no signal energy would remain on the X'Y' or Y'X' components of the upper layer; and the signal on the Y'Y' components of the upper layer should be time-lagged versions of the X'X' components.

After rotation into the primed coordinate frame comes the key step of applying a static shift to all data generated by one of the simulated source polarizations, the y', for example; thus the Y'X', Y'Y' and Y'Z' components from all depths at and below the bottom of the upper layer are time shifted by the amount needed to eliminate the lag between X'X' and Y'Y' wavelets at the bottom of the upper layer. Eliminating this lag is equivalent to positioning simulated x' and y' source polarizations at the same depth, specifically at the top of the second layer. The initial rotation will not have properly minimized energy on the X'Y' or Y'X' components of the lower layer because the effective x' and y' source polarizations acted as though they were excited at different depths (i.e., different times). The "rotations" which follow the stripping, however, should do a good job of minimizing energy on those off-diagonal components down to the bottom of the second layer. Also, "rotations" after stripping should cause lags to increase from a value of zero at the level where change occurs to progressively larger values. Of course, data will not ordinarily be recorded precisely where a change occurs, so even in principle the lag should not always be strictly zero at the level closest to the interface.

Further data sets were analyzed from nin-component VSPs recorded at Cymric and Railroad Gap oil fields in California. A way to lie together conceptually the major S-wave polarization trends of the Cymric and Railroad Gap fields is to view them in terms of stresses on the San Andreas fault. The San Andreas fault runs NW-SE about 10 mi SW of the two VSP sites. Zoback et al (1987) cite much evidence that maximum horizontal compressive stress tends to be perpendicular to the fault in central California, and they propose a model involving convergent plate motion to account for such "fault-normal compression". Ordinarily, stresses associated with a vertical strike-slip fault plane would cause maximum horizontal compression at an angle of 30°45° from the fault strike (Zoback et al., 1987).

If the S-wave polarization azimuths are indicating stress direction, then they indicate maximum horizontal compression nearly orthogonal to the San Andreas at small depths, consistent with the Zoback et al. (1987) model. But at greater depths, in the Antelope shale formation, maximum compression is nearly 45° from the fault strike, consistent with the conventional strike-slip model. As stress builds up before rupture, deeper compressive stresses in close proximity to the fault may become aligned in directions conducive to strike-slip motion along the fault. Anticlinal structures parallel to the fault indicate that fault-normal compression historically has extended to greater depths than the Antelope shale, but such compression may vary with time and depth and depend strongly on proximity to rupture along the fault.

The above described procedure for analyzing vertical seismic profile shear wave data, or surface seismic reflectors shear wave data may be further described in the following manner. The data is defined to have at least two linearly independent, nearly orthogonal, and nearly horizontal source axes. Each source axis has at least two corresponding receiver axes.

1. An initial analysis of shear wave polarization directions relative to a fixed coordinate frame is performed, and apparent time lags between fast and slow shear waves are determined at several depths.

2. Cues in the data are identified that suggest shear wave polarization change.

3. The natural polarization directions of and the time lag between the fast and slow shear waves in an upper layer are determined, above and adjacent to the shallowest depth where the cues suggest polarization changes. Other depths may be used as well, even if no cues suggest polarization changes.

4. The source and receiver axes of all the data that are below or at the shallowest depth of indicated polarization changes are then rotated by an azimuth angle determined down to this depth, so that the first source and receiver axes are aligned with the natural polarization direction of the fast shear wave, and the second receiver axis is at a significantly different azimuth angle, and so that the second source and first corresponding receiver axis are aligned with the natural polarization direction of the slow shear wave in the upper layer, while the second corresponding receiver axis is at a significantly different azimuth angle.

5. A static shift is then applied to all data components corresponding to one of the effective sources, either to components corresponding to the source aligned with the fast shear wave polarization direction or to components corresponding to the source aligned with the slow shear wave polarization directions, to eliminate the time lag in the upper layer above and adjacent to the shallowest depth where the cues suggest polarization changes are indicated.

6. Shear wave polarization azimuth angles are then determined for the shallowest depth where polarization I changes are indicated.

7. The azimuth angles are then compared to the strike of a selected fault which is near enough to be affected by compressional or tensional stress which is associated with the azimuth angles.

8. Time lags between the fast and slow shear waves are determined at least at one depth in the upper layer.

9. The above steps are then repeated at a later time, to evaluate time varying changes in the shear wave polarization azimuth angles, or in the time lags between the shear waves. Further shear wave polarization changes can be evaluated by repeating steps 1 through 9.

The above method may also be used for vertical seismic profile (VSP) data or surface seismic reflection data that has only a single source axis. Only the receiver axes are rotated in this case.

If surface seismic reflection shear wave data is analyzed, one method includes an initial analysis of shear wave polarization directions relative to a fixed coordinate frame in similarly recorded VSP data from a nearby well, and the subsequent determination of the time lags. Surface seismic reflection shear wave data can also be analyzed without the use of VSP data.

EXAMPLE

1. Lost Hills

Data sets to be discussed in detail are from nine-component VSPs recorded in two wells 862 ft apart, the 11-10X and the 1-9J wells of the Lost Hills oil field in the southern San Joaquin Valley of California. By nine-component data we mean records from three orthogonal receiver components which detected waves as if from three separate, orthogonal source polarizations as illustrated on FIG. 3. The x-axis shown on FIG. 3 is along a source vehicle axis, and receiver axes are computationally rotated after recording to coincide with the source axes. The 2×2 S-wave data matrix consists of four of the nine data components obtained with three orthogonal sources and three orthogonal receivers. For example, the XY data component is from the x source component and the y receiver component. Except for preliminary processing, only data of the 2×2 S-wave data matrix was treated; that is, data from x and y sources and receivers, or four of the nine components. The coordinate frame for recording and processing was a right-handed Cartesian frame with the x-axis along a source vehicle axis. After determining S-wave polarization directions, we reoriented the frame relative to true north.

The 11-10X Well

For the 11-10X well, two orthogonally oriented Omnipulse airgun sources were used, and were located 57 and 68 ft from the well and as close to each other as possible. Data were recorded without moving the sources. Source guns were tilted at 45°, and each was fired five times left and five times right for a total of 20 pops per receiver level. Source zero-times were obtained from accelerometers screwed into the baseplates. Locations and azimuths of sources were determined by surveyors after we completed the VSP.

The downhole receiver was a three-component (3-C) SSC K tool with a Gyrodata gyrocompass for determining absolute orientation. With the receiver clamped at the maximum depth, 1720 ft, and sources at VSP positions several series of source impacts were recorded before, during and after the hydraulic fracturing of the 12-10 well to monitor any changes in S-wave polarization that might result from the fracturing. Fracturing did not detectably affect data of the 11-10X well, although it caused transient changes in data simultaneously monitored in a well opposite the 12-10 well.

After recording at the 1720 ft depth, recording occurred at increments of 80 ft from 1700 ft to 900 ft, with the final level at 800 ft.

The 1-9J Well

For the 1-9J well, a single ARIS (ARCO Impulsive Source, provided by Western Geophysical) was used for the near offset portion of the VSP and alternated between two ARIS sources for rings of offset VSPs. For near offset recording, the ARIS was 50 ft from the well. For offset recording, we positioned the sources successively at eight points nominally 45° apart in each of two concentric rings nominally at 350 and 700 ft from the well. Each source position was marked with two 14 inch rebar pegs whose locations were subsequently surveyed for accurate source locations and azimuths. For near offset recording a special ARIS baseplate pad of riprap and road base gravel was built in order to do all recording without moving the source. For offset recording no pads were needed because source effort at a given position was small. ARIS made 20 impacts per receiver level or offset position, five in each of four directions—fore, aft, left and right—with the impactor tilted 15° from the vertical. The source vehicle axis pointed towards the well at every source location. Source zero-times were obtained from pulses from an accelerometer atop the impactor, the pulses transmitted to the recording truck via hard-wire connection.

The downhole receiver for the 1-9J well was the LRS-1300 3-C tool with the Gyrodata gyrocompass attached. Receiver components were gimballed so that two were always horizontal and the third vertical. Recording occurred at increments of 100 ft from depths of 2100 ft to 100 ft for the near offset VSP but at a fixed 2000 ft for the offset VSPs. After completing the near offset VSP the receiver was lowered to the 2000 ft level. That level was recorded again, without moving the source, before going to the offset VSP locations. Although the source baseplate was not moved for all near offset recording, it had sunk more than a foot from the beginning of near offset recording to the end. The receiver remained clamped at the 2000 ft level without repositioning for all subsequent offset VSP recording.

The well was a nearly vertical cased and cemented hole which had not yet been perforated. Maximum deviation from vertical was 1.1°, and the bottom of the hole was laterally displaced only 10 ft from the top. The fluid level was lowered to about 300 ft to avoid tube waves, which were undetectable in both wells.

DATA CONDITIONING

Birefringence effects were analyzed in data which were thought to be as close to being unprocessed as possible, but the following data conditioning steps were deemed necessary. The first step was to calculate and apply zero-time corrections (statics) based on source accelerometer pulses. The second step was, for each receiver depth or source offset position, and for each receiver component, to sum the five traces of like source polarity and then subtract sums for which impacts were azimuthally opposite in order to simulate a source that applied a purely horizontal impulse.

Such a source produces vertically traveling S-waves with little contamination from vertically traveling P waves. A further conditioning step was to rotate the x-axis of the downhole receiver into alignment with the source axis, accomplished with the aid of gyrocompass and surveyor data. Also, data from receivers that were not gimbal mounted were rotated initially to make the receiver z-axis vertical.

Before analyzing the data for S-wave polarization directions, we computationally rotated the receiver data so as to minimize S-wave energy on the vertical components. This rotation, which requires two Euler angles, causes the plane of the two nearly horizontal receiver components to coincide with the plane of S-wave displacements.

For near offset VSP data the amount of tilt was small, typically 6°–10°. Such a tilt puts the receiver plane out of alignment with the source plane, which is horizontal. However, this misalignment is unlikely to cause problems because of the small size of the tilt and because source radiation patterns put S-wave energy nearly equally into all possible S-wave polarization directions for nearly vertical travel. Whether or not the tilt was applied made no difference in azimuth angles and a negligible difference in lags (0.1 ms maximum) calculated from near offset data. For the offset data a few of the angles differed by 1°.

The final data conditioning steps involved amplitude adjustments and bandpass filtering. It is assumed that the components of body waves in the y direction from the x oriented source must be identical to the components of body waves in the x direction from the y oriented source. That is, to diagonalize the $2 \times 2$ S-wave data matrix by a single rotation angle, it is necessary that the XY and YX data components be identical, where XY indicates data from the x source on the y receiver. For this case of nearly vertical rays, and under the assumptions of no differential S-wave attenuation and isotropic geophone response, any differences in total wave energy from the x source relative to those from the y source should be attributable to source or near surface properties. Hence, an amplitude adjustment was applied to all data (i.e., data from all three receiver components) of the y source to make them, in a time window corresponding to the S-wave wavelets, have the same energy as those of the x source. For effectiveness of data display the energy of the data in that S-wave time window was also adjusted to be the same at every depth, while taking care not to alter relative amplitudes of data from a given source component. Finally, to eliminate high frequency noise, a mild high-cut filter was applied.

RESULTS

Near Offset VSP Data

Data from the 1720 ft level of well 11-10X are shown in FIG. 4 as initially recorded, and in FIG. 5 after "rotation" to minimize energy on the off-diagonal components. The similarity of the two S-wave wavelets after rotation is noteworthy, as are the relatively low amplitudes of the off-diagonal components.

Data from well 1-9J comprise a much more complete set than do those of well 11-10X. FIG. 6 shows the same data after rotation to minimize energy on the off-diagonal components in the analysis window indicated. Low amplitudes within the analysis window on the off-diagonal components at all depths suggest the rotation criterion worked well for this data set, and that the subsurface S-wave polarizations were relatively uniform.

Initial rotation analyses gave azimuths for the 11-10X well data that were nearly constant over their relatively limited depth range. In contrast, analyses of the 1-9J data gave azimuths that showed a substantial and systematic change with depth (FIG. 7.) The two data points in FIG. 7 at the 2000 ft level were recorded on successive days, one near the beginning of the experiment, the other after recording up to the 100 ft level and then lowering the tool again, and hence provide a measure of reproducibility of results. The change in polarization azimuth with depth was counter to expectations from models and led us to suspect that a near surface layer with a different polarization azimuth was contaminating analysis of deeper data. The strongest indication that S-wave polarizations in the near surface layer were different from those at greater depths is the azimuth of 13° at 100 ft in FIG. 7. Subsequent angles show a systematic increase in azimuth angle, to 31° at 200 ft and from there up to about 60° at 2100 ft. The change is not erratic, as might be expected for random errors, but smooth, indicating a possible systematic error that might be eliminated by stripping off a near surface layer.

Initial rotation analyses gave a time lag of 9.6 ms at 100 ft and 6.5 ms at 200 ft, below which level the lag increased monotonically down to 800 ft. The 9.6 ms value at 100 ft is assumed to be aberrant, possibly because of the horizontal component of raypath at that small depth. Consequently 6.5 ms was chosen as the amount to strip off initially after rotating source and receiver x-axes to 13°, the azimuth calculated at the 100 ft depth. Stripping simplifies the picture considerably. Instead of S-wave polarization aximuths, varying more than 25° for depths below 100 ft, as they did before stripping, the azimuths now cluster tightly about 60° with standard deviation of 2.8°. The first five azimuths, however, show a systematic drop which look as suspicious as the previous systematic rise in azimuth. Hence it is suspected that the initial angle and lag are not optimal. To explore the dependence of the azimuths on initial angle and lag, the near surface layer is stripped off using several other starting angles and lags. Results in FIGS. 8 and 9 show that calculated azimuth angles are insensitive to starting angle but sensitive to starting lag. An angle of 6° and a lag of 5 ms were chosen as the best values. Comparing data analyses before and after stripping off the near surface layer (FIG. 8) illustrates how a highly birefringent, thin layer can contaminate analysis of data recorded more than a 1000 ft below it.

Variations in S-wave lags with depth after stripping off the near surface layer (FIG. 10) indicate a significant change in birefringence at about 700 ft. The lags rise uniformly, then level off, then drop before continuing to rise again. If the subsurface were homogeneous, the lags would continue to increase at a constant rate; while if the rock became isotropic, lags would remain constant. The only way lags can diminish, as they do from 900–1200 ft, is for anisotropy to change.

Stripping down to 700 ft and then performing the "rotation" analysis showed that there was no significant change in azimuth and no consistent increase in lags until below 900 ft. Azimuth changed between 900 ft and 1200 ft, but changes in lags there were inconsistent and small, reaching a maximum of 2.1 ms. The zone from 900–1200 ft, then, caused too little S-wave splitting to have a significant impact on polarization analysis below 1200 ft. The final layer stripping of the 1-9J well data hence involved stripping off the zone from 900–1200 ft. Note that the azimuth change in this zone was undetectable before layer stripping (FIG. 7).

Results of layer stripping analyses from the surface to TD are summarized in FIGS. 11 and 12. On FIG. 11, the angles and lags posted alongside the data points indicate values of layer stripping parameters applied at the top of the layer. For example, the near surface layer was stripped off with an initial rotation angle of either 7° or 0°, indicated by the different symbols, and a static of 5 ms. (These angles unlike the others are relative to the source azimuth, which was N6° E.) Layer stripping parameters for deeper layers are given relative to the paramete's for the layers immediately above them. The similarity of the two sets of results shows that a 7° difference in initial rotation angle had little effect on answers at deeper levels. Except for the near surface layer and the zone from 700–1200 ft, the subsurface at the 1-9J well (FIG. 12) proved to be rather uniformly birefringent.

As a check on the validity of layer stripping, it is useful to monitor VSP traces closely after each stripping to determine whether the results fit layer stripping models. We have found that seismic data usually fit better after layer stripping than before. For example, FIG. 13 compares off-diagonal components at the deepest levels before and after layer stripping. Traces are from depths below 1200 ft. In the analysis window, signal amplitudes are lower after layer stripping (bottom traces) than before (top traces). This indicates that layer stripping caused a better fit with the seismic model. Wave amplitudes in the figure relative to trace spacing are four times those of FIG. 6. According to the model, amplitudes of the S-wave direct arrivals should be zero after the "rotations". Although FIG. 6 shows that amplitudes of off-diagonal direct arrival S waves are low relative to those of S waves on the diagonals, they are clearly lower after layer stripping than before.

Offset VSP Data

Offset data of the 1-9J experiment gave remarkably consistent S-wave polarization azimuths, the mean azimuth being 55° and the standard deviation 6.3°. The consistency results from the high S/N, from the relative simplicity of anisotropy in that area and from the fact that the near surface layer had little influence on data recorded 2000 ft below it. The lags are much less consistent than the azimuths and vary systematically along the polarization direction of the fast S-wave. It is likely that the variation in lags derives from shallow raypath segments, because variations of the magnitudes indicated would be unlikely to originate from portions of raypaths in close proximity, such as those at depth, which converge on the receiver.

Support for this proposed correlation between lag variations and shallow raypath segments comes from comparing lags of the 11-10X VSP with those of the near offset 1-9J VSP. The increase in 11-10X lags between 1200–1700 ft resembles that of the 1-9J (FIG. 10). The absolute magnitudes, however, are lower in the 1-9J data by about 8 ms, consistent with the lag variation observed. Part of the difference in absolute lag (up to 4 ms) appears to result from a relatively small decrease in 11-10X lag in the anomalous zone from 900–1200 ft, but the rest must occur shallower in the section.

Cymric and Railroad Gap Oilfields

Further data sets were analyzed from nine-component VSPs recorded at Cymric and Railroad Gap oil fields in California.

At Cymric, major changes in S-wave polarization direction with depth were clearly documented, but the reasons for the changes are not clear. The question is whether the polarization changes correspond to changes in horizontal stress direction or whether they simply indicate changes in preexisting cracks or other structures. Information on in situ stress directions is sketchy at best for both oil fields, but what data are available at Cymric suggest that the polarization direction of the fast S-wave parallels the direction of maximum horizontal stress below the unconformity at about 975 ft. The fast S-wave polarization direction there is about N 10° E.

Information that corroborates a northerly direction of maximum horizontal stress below the unconformity comes from analysis of tiltmeter data recorded during hydraulic fracturing in the 1116S well located in the adjacent section to the east. Tiltmeter data analysis concluded that hydraulic fracturing at a depth of 2300 ft created a nearly vertical fracture striking N 7°W±7°. This tiltmeter result was obtained after compensating for a point loading force calculated to have been exerted on the surface, and subsequently removed, by fluid and propant injected during the fracturing.

Above the unconformity at Cymric, geologic bedding is relatively flat, consistent with the VSP well's location near the crest of a broad anticline. Below the unconformity, however, bedding tilts about 35° to the southwest. If anisotropy symmetries tilt similarly, even if there are oriented vertical cracks or a well-defined direction of maximum horizontal stress, it is possible that the polarization direction of the fast S-wave may be uncorrelated with the crack or stress direction. Modeling suggests that, if S-wave polarizations of offset VSP data agree with those of zero offset data when anisotropy has low symmetry, then there is likely to be near vertical symmetry axis or "pseudo symmetry axis"; and in relatively simple cases, polarization of the fast S-wave will be oriented along the direction of fracture strike or of maximum horizontal stress. Thus, evidence from analysis of offset VSP data combines with supplementary information presented above to support interpreting the polarization direction of the fast S-wave in near offset data as the direction of maximum horizontal stress. With "pseudo symmetry axis" we mean that the medium does not have a true vertical symmetry axis but is so close to having one that it behaves almost as though it did.

The Cymric near offset VSP data show that the polarization direction of the fast S-wave changes from N 60° E in the uppermost 800 ft to N 10° E from 800-1550 ft. This change, in view of the foregoing, suggests that the direction of maximum horizontal stress rotated about 50° to the north a short distance above the unconformity.

A correlation of stress direction with S-wave polarization at Railroad Gap is suggested from internal evidence. Ignoring the weakly birefringent third anisotropic layer (FIGS. 14 and 15) and interpreting broadly, it is noted that the trend in azimuth of the fast S-wave polarization down to about 5300 ft is somewhat like that at Cymric. FIG. 14 shows that seven layers were needed to accommodate changes in S-wave polarization. The circles 1 represent azimuth angle data points, and the solid vertical bars 2 represent the extent of each layer. The plusses 3 and dotted vertical bars 4 represent layer stripping that was done with only three layers.

FIG. 15 shows that the vertical S-wave birefringence was unusually large in layer 1. Also, birefringence is seen to diminish in the deeper layers despite the usual trend of increasing monotonically within a layer.

The highly birefringent zone in the Tulare and Pebble Conglomerate sands at Railroad Gap extends down to 1300 ft (vs 800 ft at Cymric), and the Plio-Miocene unconformity at 4250 ft is also much deeper than at Cymric (975 ft). Hence, if S-wave polarization directions are considered in terms of formations instead of absolute depths, the pattern of S-wave polarization changes at Railroad Gap appears remarkably similar to that at Cymric. Fast S-wave polarization azimuth in the uppermost anisotropy layer at Railroad Gap is N 46° E vs N 60° E at Cymric. Average azimuth in the next zone of well-defined S-wave birefringence, namely, that from 2900-3700 ft, is N 16° E, while that in the deepest zone of well-defined birefringence, namely, from 3900-5300 ft, is N 15° W. The difference in fast S-wave azimuth angle between the Tulare sandstone and the Antelope shale is hence about 61° at Railroad Gap and 50° at Cymric. Thus, S-wave polarization directions and possibly also stress directions for a given subsurface formation are simply rotated 15°-25° counterclockwise at Railroad Gap field relative to what they are at Cymric.

This similarity in S-wave polarization changes with depth at Cymric and Railroad Gap supports the likelihood that S-wave polarization directions are determined by stress directions. That is, if stress determines S-wave polarizations in one of the two areas, for example, Cymric, then the similarity in behavior suggests that it does so for both.

The reasons for the changes of fast S-wave polarization direction with depth at Cymric and Railroad Gap are unknown, but at Cymric the proximity to the Plio-Niocene unconformity, a major angular unconformity, is suggestive. Hickman et al. (1988) observed analogous changes in stress direction over a 500-700 ft interval in the Hi Vista well located in a similar position relative to the San Andreas fault. They point out that rapid variations of stress magnitude and direction with depth have been observed elsewhere but have seldom been adequately explained. They suggest that a major stratigraphic discontinuity or slip on a fault might abruptly change stress magnitude or orientation.

LAYER STRIPPING RESULTS

S-wave polarization azimuths are consistent with depth for a given anisotropic layer at Lost Hills; that is, in the near offset VSP they are consistent from 200-900 ft and from 1200-2100 ft. Consistency is noteworthy because each calculated azimuth is the result of an independent set of measurements. The lesser consistency in the deeper zone is expected, because layer stripping removes the "inertia" that builds up in polarization determinations as the lag between the S-wave wavelets increases. The high overall consistency in polarization azimuth results from consistency in subsurface properties, from high signal/noise (S/N) in VSP direct arrivals and from the fact that waves along vertical raypaths satisfy the model assumptions employed in data analysis. The consistency in azimuth justifies the layer stripping model, which implicitly assumes that S-wave polarizations remain constant over appreciable depth ranges, and suggests that we would have obtained no better results by calculating transfer functions.

Layer stripping was effective and important for eliminating effects of a thin, near surface anisotropic layer which had natural S-wave polarizations different from those of deeper materials. Layer stripping was less important for dealing with a change in anisotropy from 700–1200 ft because of the small change in lag there. It is evident from data analysis (FIGS. 7 and 8) that the near surface layer adversely affected polarization analysis down at least to 1500 ft, and to a serious degree down to about 600 ft; but the effect is small at the deepest levels. Birefringence of deeper formations will overcome contamination from a near surface layer when the lag from the near surface layer is small compared with a wavelength and when the lag between $S_1$, and $S_2$, is much larger than the lag from the near surface layer. FIG. 2 makes it apparent that, if the lag from the near surface layer were to approach a significant fraction of a wavelength, layer stripping would be necessary in order to analyze data by "rotations". However, when lags are that large, other analysis techniques may work well.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method of determining fault plane stress build-up, by analyzing seismic shear wave data, said data having at least one linearly independent, nearly horizontal source axis (Sx), and each of said source axes having at least first and second linearly independent, nearly orthogonal, and nearly horizontal receiver axes (Rx, Ry), to evaluate changes in shear wave polarization with depth comprising the steps of:
   (a) performing an initial analysis of shear wave polarization directions relative to a fixed coordinate frame, and determining the apparent time lags between a fast and a slow shear wave, at several depths;
   (b) identifying cues in said data that indicate shear wave polarization changes;
   (c) determining the natural polarization directions of and the time lag between said fast and slow shear waves, in an upper layer, above and adjacent to the shallowest depth where said cues suggest polarization changes are indicated;
   (d) rotating said receiver axes (Rx, Ry) of all of said data that are at or below the shallowest depth where said polarization changes are indicated, by an azimuth angle determined down to said depth, so that said first receiver axis, (Rx) is aligned with the natural polarization direction of said fast shear wave in said upper layer, and said second receiver axis is at an azimuth angle which is nearly 90 degrees to said first receiver axis;
   (e) applying a static shift either to data components aligned with said fast shear wave polarization direction, or to components corresponding to the source aligned with the slow shear wave polarization direction, to eliminate said time lag in said upper layer above and adjacent to the shallowest depth where said cues suggest polarization changes are indicated;
   (f) determining shear wave polarization azimuth angles for said shallowest depth where polarization changes are indicated;
   (g) comparing said shear wave polarization azimuth angles to the strike of a selected fault, said fault located close enough to a position where said data originated, to be effected by a compressional or tensional stress associated with said azimuth angle;
   (h) determining time lags between said shear waves at one or more depths in said upper layer; and
   (i) repeating steps (a) through (g) at a later time, to evaluate time varying changes in said shear wave polarization azimuth angles, or in said time lags between said shear waves.

2. The method of claim 1, further comprising the steps of:
   (j) repeating steps (a) and (b); and
   (k) repeating steps (c) through (i) if step (b) identifies cues in said data that indicate further shear wave polarization changes.

3. A method of determining fault plane stress build-up, by analyzing vertical seismic profile shear wave data, said data having at least first and second linearly independent, nearly orthogonal, and nearly horizontal source axes (Sx,Sy), and each of said source axes having at least first and second linearly independent, nearly orthogonal, and nearly horizontal receiver axes (Rxx,Rxy,Ryx,Ryy), to evaluate changes in shear wave polarization with depth comprising the steps of:
   (a) performing an initial analysis of shear wave polarization directions relative to a fixed coordinate frame, and determining the apparent time lags between a fast and a slow shear wave, at several depths;
   (b) identifying cues in said data that indicate shear wave polarization changes;
   (c) determining the natural polarization directions of and the time lag between said fast and slow shear waves, in an upper layer, above and adjacent to the shallowest depth where said cues suggest polarization changes are indicated;
   (d) rotating said source and said receiver axes of all of said data that are at or below the shallowest depth where said polarization changes are indicated, by an azimuth angle determined down to said depth, so that said first source axis (Sx) and said first corresponding receiver axis (Rxx) are aligned with the natural polarization direction of said fast shear wave in said upper layer, and said second corresponding receiver axis (Rxy), is at an azimuth angle which is nearly 90 degrees to said first receiver axis, and so that said second effective source axis (Sy) and said first corresponding receiver axis (Ryy) are aligned with the natural polarization direction of said slow shear wave in said upper layer, while said second corresponding receiver axis (Ryx) is at an azimuth angle which is nearly 90 degrees to said first receiver axis;
   (e) applying a static shift to all data components corresponding to one of said effective sources, either to components corresponding to the source aligned with said fast shear wave polarization direction, or to components corresponding to the source aligned with the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (g) at a later time, to evaluate time varying changes in said shear wave polarization azimuth angles, or in said time lags between said shear waves.

4. The method of claim 3, further comprising the steps of:

(j) repeating steps (a) and (b); and (k) repeating steps (c) through (i) if step (b) identifies cues in said data that indicate further shear wave polarization changes.

5. A method of determining fault plane stress build-up by analyzing vertical seismic profile shear wave data, said data having a single source axis, (Sx), oriented at an angle between natural polarization directions of said shear waves, and at least first and second linearly independent, nearly orthogonal, and nearly horizontal receiver axes (Rx,Ry), to evaluate changes in shear wave polarization with depth comprising the steps of:

(a) performing an initial analysis of shear wave polarization directions relative to a fixed coordinate frame, and determining the apparent time lags between a fast and a slow shear wave, at several depths;

(b) identifying cues in said data that indicate shear wave polarization changes;

(c) determining the natural polarization directions of and the time lag between said fast and slow shear waves, in an upper layer, above and adjacent to the shallowest depth where said cues suggest polarization changes are indicated;

(d) rotating said receiver axes (Rx,Ry) of all of said data that are at or below the shallowest depth where said polarization changes are indicated, by an azimuth angle determined down to said depth, so that said first receiver axis (Rx) is aligned with the natural polarization direction of said fast shear wave in said upper layer, and said second receiver axis (Ry), is at an azimuth angle which is nearly 90 degrees to said first receiver axis;

(e) applying a static shift either to data components aligned with said fast shear wave polarization direction, or to components corresponding to the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (h) at a later time, to evaluate time varying changes in said shear wave polarization azimuth angles, or in said time lags between said shear waves.

6. The method of claim 5, further comprising the steps of:

(j) repeating steps (a) and (b); and (k) repeating steps (c) through (i) if step (b) identifies cues in said data that indicate further shear wave polarization changes.

7. A method of determining fault plane stress build-up, by analyzing and improving surface seismic reflection shear wave data, said data having at least first and second linearly independent, nearly orthogonal, and nearly horizontal source axes (Sx,Sy), and each of said source axes having at least first and second linearly independent, nearly orthogonal, and nearly horizontal receiver axes (Rxx,Rxy,Ryx,Ryy), to evaluate changes in shear wave polarization with depth comprising the steps of:

(a) performing an initial analysis of shear wave polarization directions relative to a fixed coordinate frame in similarly recorded vertical seismic profile data from a nearby well, and determining the apparent time lags between a fast and a slow shear wave, at several depths;

(b) identifying cues in said vertical seismic profile data that indicate shear wave polarization changes;

(c) determining the natural polarization directions of and the time lag between said fast and slow shear waves, in an upper layer, above and adjacent to the shallowest depth where said cues suggest polarization changes are indicated in said vertical seismic profile data;

(d) rotating said source and said receiver axes of all of said data that are at or below the shallowest depth where said polarization changes are indicated, by an azimuth angle determined down to said depth, so that said first source axis (Sx) and said first corresponding receiver axis (Rxx) are aligned with the natural polarization direction of said fast shear wave in said upper layer, and said second corresponding receiver axis (Rxy), is at an azimuth angle which is nearly 90 degrees to said first receiver axis, and so that said second effective source axis (Sy) and said first corresponding receiver axis (Ryy) are aligned with the natural polarization direction of said slow shear wave in said upper layer, while said second corresponding receiver axis (Ryx) which corresponds to that effective source is at an azimuth angle which is nearly 90 degrees to said first receiver axis;

(e) applying a static shift to all data components corresponding to one of said effective sources, either to components corresponding to the source aligned with said fast shear wave polarization direction, or to components corresponding to the source aligned with the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (h) at a later time, to evaluate time varying changes in said shear wave polarization azimuth angles, or in said time lags between said shear waves.

8. The method of claim 7, further comprising the steps of:

(j) repeating steps (a) and (b); and (k) repeating steps (c) through (i) if step (b) identifies cues in said data that indicate further shear wave polarization changes.

9. A method of determining fault plane stress build-up, by analyzing surface seismic reflection shear wave data, said data having a single source axis, (Sx), oriented at an angle between natural polarization directions of said shear waves, and at least first and second linearly independent, nearly orthogonal, and nearly horizontal receiver axes (Rx,Ry), to evaluate changes in shear wave polarization with depth comprising the steps of:

(a) performing an initial analysis of shear wave polarization directions relative to a fixed coordinate frame in similarly recorded vertical seismic profile data from a nearby well, and determining the apparent time lags between a fast and a slow shear wave, at several depths;

(b) identifying cues in said vertical seismic profile data that indicate shear wave polarization changes;

(c) determining the natural polarization directions of and the time lag between said fast and slow split shear waves, in an upper layer, above and adjacent to the shallowest depth where said cues suggest polarization changes are indicated in said vertical seismic profile;

(d) rotating said receiver axes (Rx,Ry) of all of said data that are at or below the shallowest depth where said polarization changes are indicated, by an azimuth angle determined down to said depth, so that said first receiver axis (Rx) is aligned with the natural polarization direction of said fast shear wave in said upper layer, and said second receiver axis (Ry), is at an azimuth angle which is nearly 90 degrees to said first receiver axis;

(e) applying a static shift either to data components aligned with said fast shear wave polarization direction, or to components corresponding to the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (h) at a later time, to evaluate time varying changes in said shear wave polarization azimuth angles, or in said time lags between said shear waves.

10. The method of claim 9, further comprising the steps of:

(j) repeating steps (c) through (i) if step (b) identifies cues in said data that indicate further shear wave polarization changes.

11. A method of determining fault plane stress build-up, by analyzing and improving surface seismic reflection shear wave data, said data having at least first and second linearly independent, nearly orthogonal, and nearly horizontal source axes (Sx,Sy), and each of said source axes having at least first and second linearly independent, nearly orthogonal, and nearly horizontal corresponding receiver axes (Rxx,Rxy,Ryx,Ryy), to evaluate changes in shear wave polarization with depth comprising the steps of:

(a) performing an initial analysis of shear wave polarization directions relative to a fixed coordinate frame, and determining the apparent time lags between a fast and a slow shear wave, at several depths;

(b) identifying cues in said data that indicate shear wave polarization changes;

(c) determining the natural polarization directions of and the time lag between said first and second shear waves, in an upper layer, above and adjacent to the shallowest depth where said cues suggest polarization changes are indicated;

(d) rotating said source and said receiver axes of all of said data that are at or below the shallowest depth where said polarization changes are indicated, by an azimuth angle determined down to said depth, so that said first source axis (Sx) and said first corresponding receiver axis (Rxx) are aligned with the natural polarization direction of said fast shear wave in said upper layer, and said second corresponding receiver axis (Rxy), is at an azimuth angle which is nearly 90 degrees to said first receiver axis, and so that said second effective source axis (Sy) and said first corresponding receiver axis (Ryy) are aligned with the natural polarization direction of said slow shear wave in said upper layer, while said second corresponding receiver axis (Ryx) is at an azimuth angle which is nearly 90 degrees to said first receiver axis;

(e) applying a static shift to all data components corresponding to one of said effective sources, either to components corresponding to the source aligned with said fast shear wave polarization direction, or to components corresponding to the source aligned with the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (h) at a later time, to evaluate time varying changes in said shear wave polarization azimuth angles, or in said time lags between said shear waves.

12. The method of claim 11, further comprising the steps of:

(j) repeating steps (a) and (b); and (k) repeating steps (c) through (i) if step (b) identifies cues in said data that indicate further shear wave polarization changes.

13. A method of determining fault plane stress build-up, by analyzing surface seismic reflection shear wave data, said data having a single source axis, (Sx), oriented at an angle between natural polarization directions of said shear waves, and at least first and second linearly independent, nearly orthogonal, and nearly horizontal receiver axes (Rx,Ry), to evaluate changes in shear wave polarization with depth comprising the steps of:

(a) performing an initial analysis of shear wave polarization directions relative to a fixed coordinate frame, and determining the apparent time lags between a fast and a slow shear wave, at several depths;

(b) identifying cues in said data that indicate shear wave polarization changes;

(c) determining the natural polarization directions of and the time lag between, said fast and slow shear waves, in an upper layer, above and adjacent to the shallowest depth where said cues suggest polarization changes are indicated;

(d) rotating said receiver axes (Rx,Ry) of all of said data that are at or below the shallowest depth where said polarization changes are indicated, by an azimuth angle determined down to said depth, so that said first receiver axis (Rx) is aligned with the natural polarization direction of said fast shear wave in said upper layer, and said second receiver axis (Ry), is at an azimuth angle which is nearly 90 degrees to said first receiver axis;

(e) applying a static shift either to data components aligned with said fast shear wave polarization direction, or to components corresponding to the slow shear wave polarization direction, to eliminate said time lag in said upper layer above and adjacent to the shallowest depth where said cues suggest polarization changes are indicated;

(f) determining shear wave polarization azimuth angles for said shallowest depth where polarization changes are indicated;

(g) comparing said shear wave polarization azimuth angles to the strike of a selected fault, said fault located close enough to a position where said data originated, to be effected by a compressional or tensional stress associated with said azimuth angle;

(h) determining time lags between said shear waves at one or more depths in said upper layer; and (i) repeating steps (a) through (h) at a later time, to evaluate time varying changes in said shear wave polarization azimuth angles, or in said time lags between said shear waves.

14. The method of claim 13, further comprising the steps of:

(j) repeating steps (a) and (b); and (k) repeating steps (c) through (i) if step (b) identifies cues in said data that indicate further shear wave polarization changes.

15. A method of analyzing seismic shear wave data, said data having at least one linearly independent, nearly horizontal source axis (Sx), and each of said source axes having at least first and second linearly independent, nearly orthogonal, and nearly horizontal receiver axes (Rx,Ry), to evaluate changes in shear wave polarization with depth comprising the steps of:

(a) performing an initial analysis of shear wave polarization directions relative to a fixed coordinate frame, and determining the apparent time lags between a fast and a slow shear wave, at several depths;

(b) determining the natural polarization directions of and the time lag between said fast and slow shear waves, in an upper layer, above and adjacent to a selected depth where shear wave polarization changes are suspected;

(c) rotating said receiver axes (Rx, Ry) of all of said data that are at or below the shallowest depth where said polarization changes are suspected, by an azimuth angle determined down to said depth, so that said first receiver axis, (Rx) is aligned with the natural polarization direction of said fast shear wave in said upper layer, and said second receiver axis is at an azimuth angle which is nearly 90 degrees to said first receiver axis;

(d) applying a static shift either to data components aligned with said fast shear wave polarization direction, or to components corresponding to the source aligned with the slow shear wave polarization direction, to eliminate said time lag in said upper layer above and adjacent to the shallowest depth where said polarization changes are suspected;

(e) determining shear wave polarization azimuth angles for said shallowest depth where polarization changes are suspected;

(f) comparing said shear wave polarization azimuth angles to the strike of a selected fault, said fault located close enough to a position where said data originated, to be effected by a compressional or tensional stress associated with said azimuth angle;

(g) determining time lags between said shear waves at one or more depths in said upper layer; and (h) repeating steps (a) through (g) at a later time, to evaluate time varying changes in said shear wave polarization azimuth angles, or in said time lags between said shear waves.

16. The method of claim 15, further comprising the steps of:

(i) repeating step (a); and (j) repeating steps (b) through (h) if further shear wave polarization changes are suspected.

* * * * *

UNITED STATES PATENT AND TRADEMARK OFFICE
CERTIFICATE OF CORRECTION

PATENT NO. : 5,060,204
DATED : October 22, 1991
INVENTOR(S) : Donald F. Winterstein It is certified that error appears in the above-identified patent and that said Letters Patent is hereby corrected as shown below:

Claim 10, Col. 24, line 1   "(j) repeating" should read --(k) repeating--

Claim 10, item (j) is missing
PLEASE INSERT   --(j) repeating steps (a) and (b); and--

Signed and Sealed this

Twenty-first Day of June, 1994

Attest:

BRUCE LEHMAN

Attesting Officer   Commissioner of Patents and Trademarks